(12) United States Patent
Greenbaum et al.

(10) Patent No.: US 7,885,340 B2
(45) Date of Patent: Feb. 8, 2011

(54) SYSTEM AND METHOD FOR GENERATING MULTIPLE SYNCHRONIZED ENCODED REPRESENTATIONS OF MEDIA DATA

(75) Inventors: Gary S. Greenbaum, Seattle, WA (US); Jeffrey M. Ayars, Federal Way, WA (US); Gregory J. Conklin, Seattle, WA (US); Alan F. Lippman, Seattle, WA (US); Bradley D. Hefta-Gaub, Seattle, WA (US); Dale R. Stammen, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 990 days.

(21) Appl. No.: 11/022,474

(22) Filed: Dec. 22, 2004

(65) Prior Publication Data

US 2005/0123058 A1 Jun. 9, 2005

Related U.S. Application Data

(63) Continuation of application No. 09/300,139, filed on Apr. 27, 1999, now abandoned.

(51) Int. Cl.
*H04N 7/12* (2006.01)
*H04B 1/66* (2006.01)

(52) U.S. Cl. .................. 375/240.28; 382/232

(58) Field of Classification Search ............. 348/425.1, 348/425.3, 425.4, 500, 516, 577, 521, 522, 348/142, 565, 563, 564, 416, 512, 513, 518, 348/536, 14.1, 14.13, 14.14, 14.15, 14.12, 348/154, 155, 431, 452, 399, 397, 469; 375/240.28, 375/240.26, 240.12, 240.16, 240.01, 240.1, 375/240.13, 240.14, 240, 240.2; 382/239, 382/232, 236
See application file for complete search history.

(56) References Cited

U.S. PATENT DOCUMENTS

| 4,800,376 A | * | 1/1989 | Suga et al. ............... 345/1.3 |
| 4,988,998 A | | 1/1991 | O'Brien |
| 5,196,933 A | | 3/1993 | Henot |

(Continued)

OTHER PUBLICATIONS

Guy Côté et al., *H.263+: Video Coding at Low Bit Rates* (1998).

(Continued)

*Primary Examiner*—Behrooz Senfi
(74) *Attorney, Agent, or Firm*—ÆON Law; Adam L. K. Philipp

(57) ABSTRACT

The present invention provides a system and methods for producing multiple encoded representations of a video input sequence. The multiple representations produced each contain identified synchronization frames that allow a server and a client to switch between streamed representations in real time without interruption. Synchronization frames are frames of encoded video that can be independently decoded. A representation can thus be decoded starting at a synchronization frame. Each synchronization frame in one representation has a corresponding synchronization frame at a substantially similar temporal location in any other generated representation of the same video input sequence. The temporal co-location of synchronization frames in all representations facilitates the dynamic switching between representations during the streaming process. The present invention also provides a video encoder application that shares data during the encoding of multiple representations of a video input sequence by reusing data calculated in the encoding of one representation to encode other representations. The application can also generate the multiple encoded representations simultaneously.

58 Claims, 15 Drawing Sheets

U.S. PATENT DOCUMENTS

| | | | |
|---|---|---|---|
| 5,285,497 A | | 2/1994 | Thatcher, Jr. |
| 5,309,232 A | * | 5/1994 | Hartung et al. ............. 348/384 |
| 5,414,469 A | | 5/1995 | Gonzales et al. |
| 5,446,495 A | | 8/1995 | Tourtier et al. |
| 5,512,953 A | | 4/1996 | Nahumi |
| 5,532,940 A | | 7/1996 | Agarwal et al. |
| 5,535,138 A | | 7/1996 | Keith |
| 5,557,332 A | * | 9/1996 | Koyanagi et al. ........... 398/416 |
| 5,566,089 A | * | 10/1996 | Hoogenboom ............. 358/1.15 |
| 5,592,399 A | | 1/1997 | Keith et al. |
| 5,623,424 A | | 4/1997 | Azadegan et al. |
| 5,734,119 A | | 3/1998 | France et al. |
| 5,777,999 A | * | 7/1998 | Hiraki et al. ............... 370/509 |
| 5,877,755 A | | 3/1999 | Hellhake |
| 5,956,088 A | * | 9/1999 | Shen et al. ............. 375/240.25 |
| 6,181,383 B1 | * | 1/2001 | Fox et al. ..................... 348/515 |
| 6,298,088 B1 | * | 10/2001 | Bhatt et al. ............ 375/240.28 |
| 6,360,014 B1 | * | 3/2002 | Boon ......................... 382/233 |
| 6,466,697 B1 | * | 10/2002 | Boon ......................... 382/233 |
| 6,510,553 B1 | * | 1/2003 | Hazra ......................... 725/87 |
| 2001/0013952 A1 | * | 8/2001 | Boon ......................... 358/429 |
| 2001/0038674 A1 | * | 11/2001 | Trans ......................... 375/355 |

OTHER PUBLICATIONS

*Video Codec Test Model, Near-Term, Version 10 (TMN10) Draft 1*, International Telecommunication Union (1998).

*Draft Text of Recommendation H.263 Version 2 ("H.263+") for Decision*, International Telecommunication Union (1998).

*Video Codec for Audio-Visual Services at px64 Kbits*, ITU-T Recommendation H.261 (1993).

*Information Technology—Generic Coding of Moving Pictures and Associated Audio Information: Video*, ITU-T Recommendation H.262 (1995).

*Video Coding for Low Bit Rate Communication*, ITU-T Recommendation H.263 (1998).

K.R. Rao and J.J. Hwang, *Techniques & Standards for Image, Video & Audio Coding* 3-124, 163-355 (1996).

Martyn J. Riley and Iain E.G. Richardson, *Digital Video Communications* 15-51, 175-202 (1997).

Keith Jack, *Video Demystified* 426-652 (1996).

* cited by examiner

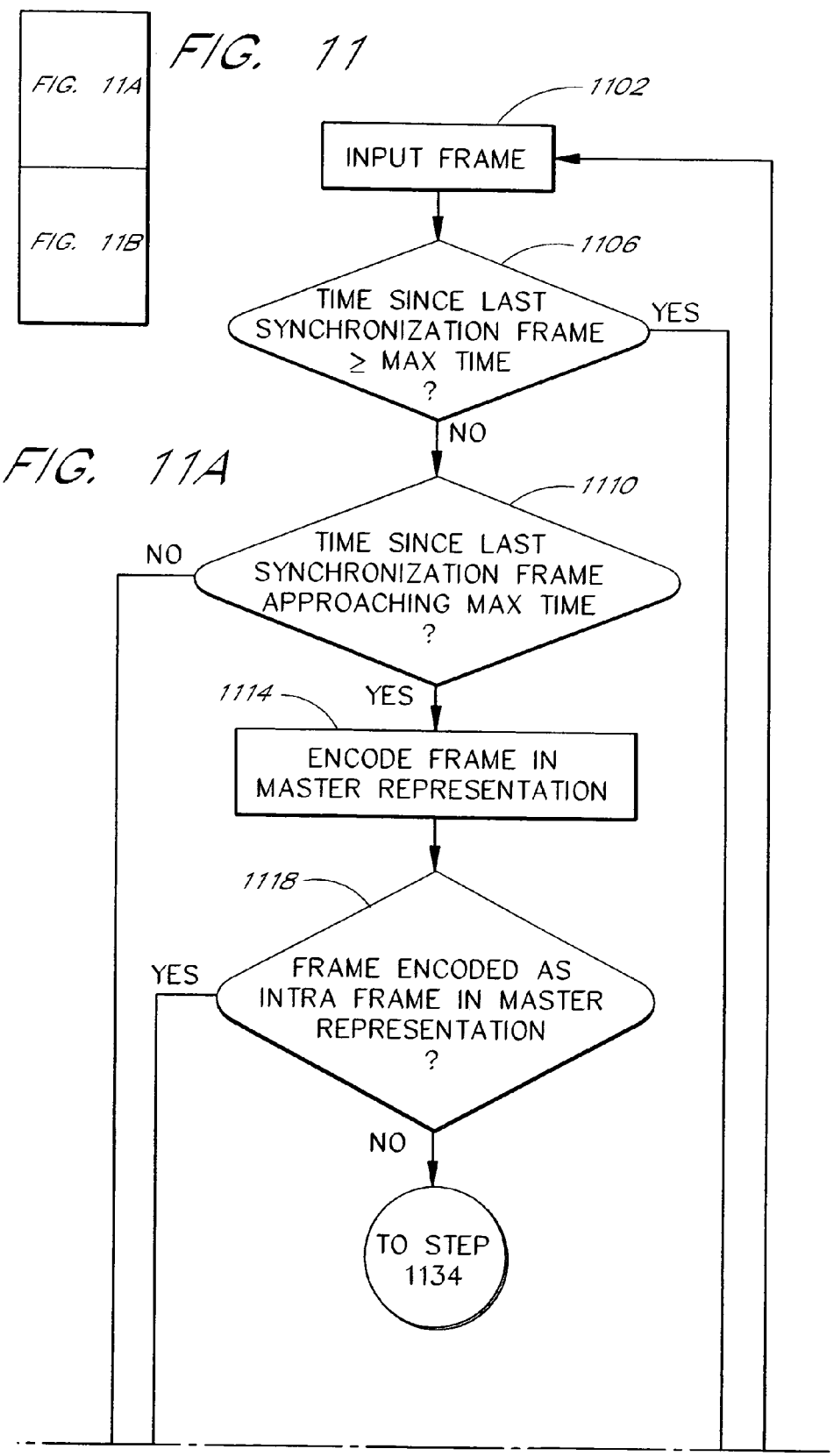

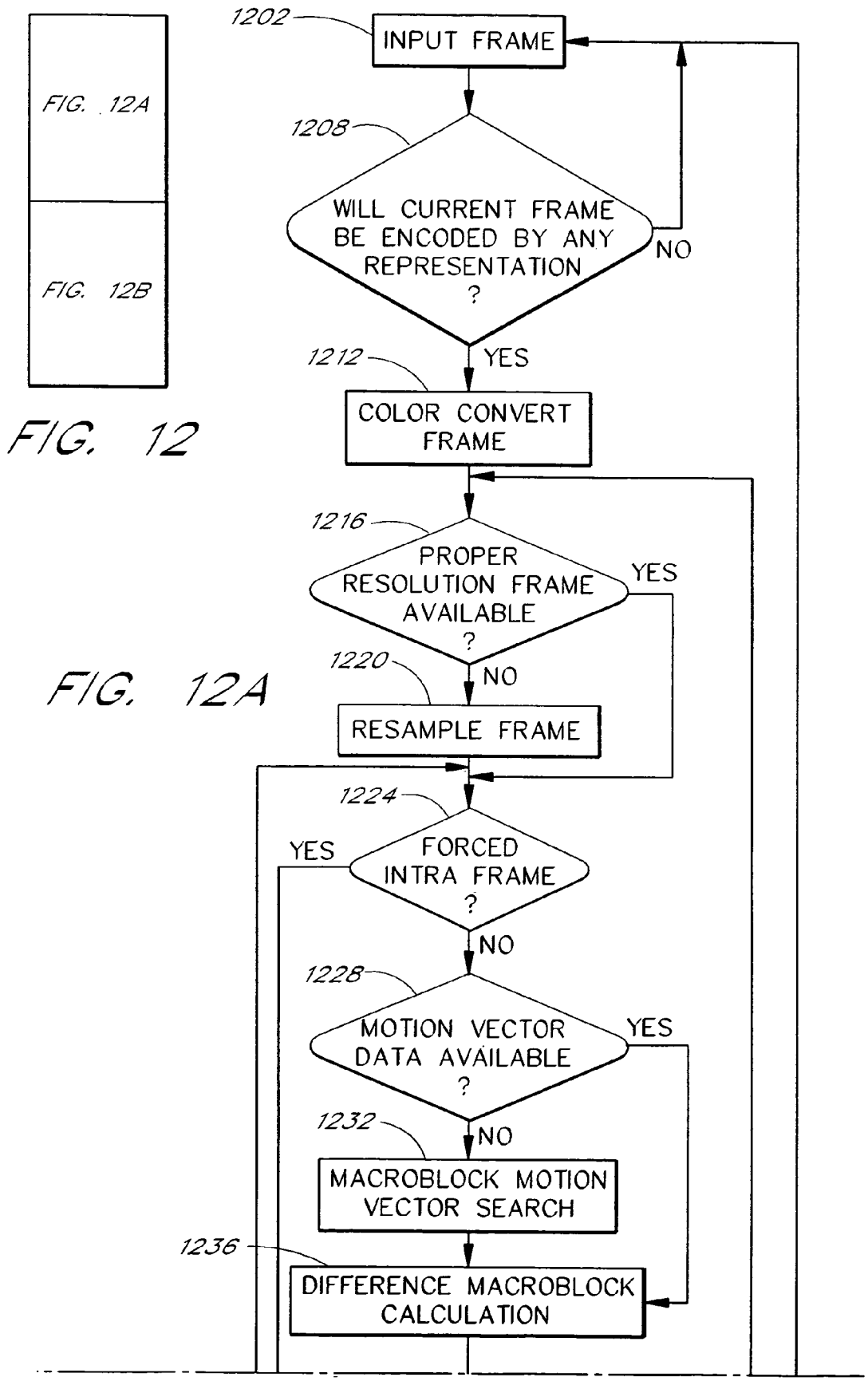

MOTION VECTOR SEARCH REFINEMENT

SYSTEM AND METHOD FOR GENERATING MULTIPLE SYNCHRONIZED ENCODED REPRESENTATIONS OF MEDIA DATA

RELATED APPLICATION

This application is a continuation of and incorporates by reference in its entirety U.S. application Ser. No. 09/300,139, filed Apr. 27, 1999 now abandoned.

FIELD OF THE INVENTION

This invention relates to the encoding of data. More specifically, the invention provides a system and method for creating multiple encoded representations of media data, wherein the encoded representations contain synchronization information, and wherein data generated in the encoding of one representation can be used to encode other representations.

DESCRIPTION OF THE RELATED ART

Digital media representations such as digital audio or video are commonly generated, stored and presented on desktop computers and other devices. Frequently, the representation to be presented is located at a remote location accessible over a computer network such as the Internet. As uncompressed representations can be quite large, representations are usually stored or transmitted in compressed formats and then decompressed for presentation. A compressed representation requires far less storage space than an uncompressed representation and can be transmitted much more quickly or over a lower bandwidth link.

To reduce storage and transmission requirements for digital video and audio, a number of encoding standards have been developed, which are well known in the art. Existing digital video encoding standards use a number of common encoding techniques including transform coding (the discrete cosine transform (DCT) is one method of transform coding), motion compensated prediction (the use and computation of motion vectors and difference frames), quantization, and entropy encoding (e.g., Huffman coding, run length coding, and arithmetic coding), among others.

A number of references disclose aspects of techniques used in digital video encoding. Examples include: ITU-T Recommendation H.261, "CODEC for audio-visual services at p×64 Kbps" 1993; ISO/IEC 13818-2, ITU-T Recommendation H.262, "Generic coding for moving pictures and associated audio, Part 2: Video" (MPEG-2); and ITU-T Draft Recommendation H.263, "Video coding for low bit rate communication" July 1995, ITU-T Recommendation H.263, Version [2] (H.263+). U.S. Pat. No. 5,414,469 to Gonzales et al. provides general background material on some of the basic techniques mentioned above. Additional references on video compression techniques include K. R. Rao and J. J. Hwang, *Techniques & Standards for Image, Video & Audio Coding*, Prentice Hall 1996, *Digital Video Communications* by Martyn J. Riley and Iain E. G. Richardson, Artech House Publishers, 1997, and *Video Demystified*, by Kieth Jack, High Text 1996. Implementation oriented background material for the H.263+ standard is provided in what is commonly known in the art as "TMN10.doc," which stands for "test model near-term, version 10," produced by the ITU—Telecommunications Standardization Sector, Study Group 16, Question 15.

In encoding digital video, a number of different encoding parameters can be varied to tailor the encoded representation to the use. These encoding parameters include resolution, quantization, and frame rate, among others. The encoding parameters can be varied to achieve encoded representations optimized for a particular bit-rate, quality, and decoding complexity.

In a streaming context, an encoded media representation is transmitted from a server to a client, over the Internet for example, and the client begins decoding and playing a re-creation of the media immediately without waiting for the entire encoded representation to be transmitted. The streamed representation should have characteristics that correspond to the resources available to transmit and decode the representation. In accordance with known encoding techniques, representations can be tailored for use by decoding computers with different available communication bandwidths and/or processor speeds. The bit rate of the representation, for example, should match the bandwidth available over the transmission link connecting the server to the client. If the representation is being streamed over a 28.8 Kbps modem link, the representation should have a bit-rate that can be sustained at 28.8 Kbps. On the other hand, if the representation is being streamed over a T1 connection, the representation can have a substantially higher bit-rate, which may provide the end user with a more enriching, higher quality media experience. A number of encoding parameters can also be varied to create an encoded representation that requires more or less computing power to decode. A representation can be tailored, for example, so that it can be decoded in real-time on a low end processing machine or in the alternative such that its decoding requires a higher performance workstation.

In some situations, the available resources may change during the streaming of a representation. Given the unpredictability of the network conditions on the Internet, for example, the available bandwidth over which a representation is being streamed may decrease suddenly and drastically. In such situations, the characteristics of the representation being streamed will no longer correspond to the available resources. The incompatibility of the available bandwidth and the bit-rate of the representation, for example, would lead to break-up, delay, and jitter in the resulting presentation of the encoded representation. What is needed is an encoding system and method that can facilitate the transmission of different encoded representations of the same media to permit servers and receiving clients to adapt to changes in available resources.

SUMMARY OF THE INVENTION

One embodiment of the present invention is a method of producing a plurality of synchronized encoded representations of an input media signal. The method comprises: (1) providing an input media signal; (2) encoding the input media signal to generate a plurality of encoded representations, wherein each representation is encoded according to a different set of encoding parameters; and (3) identifying a number of synchronization points in each of the encoded representations. One aspect of the present embodiment is one wherein the synchronization points facilitate a switching from a streaming of one of the encoded representations to another of the encoded representations with no substantial discontinuity occurring during the switching. Another aspect of the present embodiment is one wherein each of the encoded representations can be decoded starting at the synchronization points. Another aspect of the present embodiment is one wherein a temporal period between any two synchronization points in an encoded representation does not exceed a specified maximum temporal period. Another aspect of the present embodiment is one wherein each synchronization point has a substantially similar temporal location in each encoded representation. Another aspect of the present embodiment is one wherein the input media signal comprises a video input sequence, wherein the video input sequence comprises frames of digital video, and wherein the synchronization points comprise encoded frames of digital video. A preferred aspect of the method comprises: (1) identifying a frame in the input sequence; (2) encoding the identified frame to produce an encoded frame of a first encoded representation, wherein a decoding of the encoded frame of the first encoded representation does not require a decoded version of another frame; (3) identifying the encoded frame of the first encoded representation as a synchronization point; (4) encoding the identified frame to produce an encoded frame of a second encoded representation, wherein a decoding of the encoded frame of the second encoded representation does not require a decoded version of another frame; and (5) identifying the encoded frame of the second encoded representation as a synchronization point. One aspect of the present embodiment is one wherein at least a portion of each of the encoded representations is generated before any encoded representation is completely generated.

One embodiment of the present invention is a computer readable medium having stored thereon a plurality of instructions which, when executed by a processor in a computer system, cause the processor to perform a number of steps. The steps comprise: (1) accepting an input media signal; (2) encoding the input media signal to generate a plurality of encoded representations, wherein each encoded representation is encoded according to a different set of encoding parameters; and (3) identifying a number of synchronization points in each of the encoded representations. The computer readable medium may include magnetic storage media such as hard disks or floppy discs; memory devices such as flash memory, random-access memory, or read-only memory; optical storage such as a compact disc (CD), digital versatile disc (DVD), or Blu-ray disc (BD); or any other medium readable by a computer having the appropriate hardware to do so.

One embodiment of the present invention is a system for producing a plurality of encoded representations of a video input sequence. The system comprises: (1) a video encoder configured to generate the plurality of encoded representations of the video input sequence, wherein the video encoder encodes each representation according to a different set of encoding parameters and wherein each encoded representation contains synchronization frames; and (2) an output module configured to output the encoded representations. One aspect of the present embodiment is one wherein the synchronization frames facilitate a switching from a streaming of one of the encoded representations to another of the encoded representations with no substantial discontinuity occurring during the switching. One aspect of the system comprises a storage device configured to store the encoded representations. Another aspect of the system comprises a server, configured to transmit at least one of the encoded representations over a communications network for a real-time presentation, the server responsive to a transition signal to switch from transmitting one of the encoded representations to transmitting another of the encoded representations to a client without a substantial interruption in the real-time presentation. Another aspect of the system comprises a decoder configured to decode a frame preceding a first synchronization frame in one of the encoded representations, then to decode a second synchronization frame in another of the encoded representations, the second synchronization frame having substantially the same temporal location as the first synchronization frame.

One embodiment of the present invention is a video encoding system. The system comprises: (1) a host computer; (2) a digital video input sequence; (3) an output stream comprising a plurality of encoded representations of the digital video input sequence, wherein each representation is encoded according to a different set of encoding parameters, wherein each encoded representation contains synchronization frames, and wherein the synchronization frames facilitate a switching from a streaming of one of the encoded representations to a streaming of another of the encoded representations with no substantial discontinuity occurring during the switch; and (4) a video encoding application operating on the host computer, wherein the video encoding application generates the output stream from the digital video input sequence. One aspect of the present embodiment is one wherein the video encoding application is configured to generate a set of data from the digital video input sequence, the video encoding application using the set of data to generate the plurality of encoded representations of the digital video input sequence. One aspect of the system comprises a storage device used to store the encoded representations. Another aspect of the system comprises a server, configured to transmit at least one of the encoded representations over a communications network for a real-time presentation, the server responsive to a transition signal to switch from transmitting one of the encoded representations to transmitting another of the encoded representations to a client without a substantial interruption in the real-time presentation. Another aspect of the system comprises a decoder configured to decode a frame preceding a first synchronization frame in one of the encoded representations, then to decode a second synchronization frame in another of the encoded representations, the second synchronization frame having substantially the same temporal location as the first synchronization frame.

One embodiment of the present invention is a data file containing a plurality of encoded representations of a video sequence. The data file comprises: (1) a first of the encoded representations having a first set of synchronization points; and (2) a second of the encoded representations having a second set of synchronization points, wherein each of the second set of synchronization points has a temporal location within the second encoded representation that corresponds substantially to a temporal location within the first encoded representation of one of the first set of synchronization points. One aspect of the present embodiment is one wherein the encoded representations comprise segments, and wherein the segments of the encoded representations are interleaved in the data file. Another aspect of the present embodiment is one wherein the encoded representations exist in contiguous blocks within the data file. A preferred aspect of the data file comprises synchronization information, the synchronization information comprising locations of synchronization points within the data file.

One embodiment of the present invention is method of producing a plurality of encoded representations of an input media signal. The method comprises: (1) providing an input media signal; (2) generating a set of data from the input media signal; and (3) using the set of data to generate a plurality of encoded representations of the input media signal, wherein each encoded representation is encoded according to a different set of encoding parameters. One aspect of the present embodiment is one wherein each of the encoded representations is a complete and separate representation of the input media signal. Another aspect of the present embodiment is one wherein any one encoded representation can be decoded without reference to another encoded representation. Another aspect of the present embodiment is one wherein the set of data comprises intermediate encoding data. Another aspect of the present embodiment is one wherein the input media signal is a video input sequence comprising frames of digitized video. Another aspect of the present embodiment is one wherein the set of data comprises transform data. Another aspect of the present embodiment is one wherein the set of data comprises discrete cosine transform data. Another aspect of the present embodiment is one wherein the set of data comprises motion vector data. Another aspect of the present embodiment is one wherein the set of data comprises color converted frame data. Another aspect of the present embodiment is one wherein the set of data comprises resampled frame data.

One embodiment of the present invention is a computer readable medium having stored thereon a plurality of instructions which, when executed by a processor in a computer system, cause the processor to perform a number of steps. The steps comprise: (1) accepting an input media signal; (2) generating a set of data from the input media signal; and (3) using the set of data to generate a plurality of encoded representations of the input media signal, wherein each encoded representation is encoded according to a different set of encoding parameters.

One embodiment of the present invention is a system for producing a plurality of encoded representations of a video input sequence. The system comprises: (1) a video encoder configured to generate a set of intermediate encoding data from the video input sequence, the video encoder using the set of intermediate encoding data to generate the plurality of encoded representations of the video input sequence, wherein each encoded representation is encoded according to a different set of encoding parameters; and (2) an output module configured to output the encoded representations.

BRIEF DESCRIPTION OF THE DRAWINGS

Referring now to the drawings in which like reference numbers represent corresponding components throughout:

FIGS. 11A-B illustrate a flowchart of one embodiment of the synchronization frame identification process;

FIGS. 12A-B illustrate a flowchart of data sharing during the encoding process.

DETAILED DESCRIPTION

Figure 1:
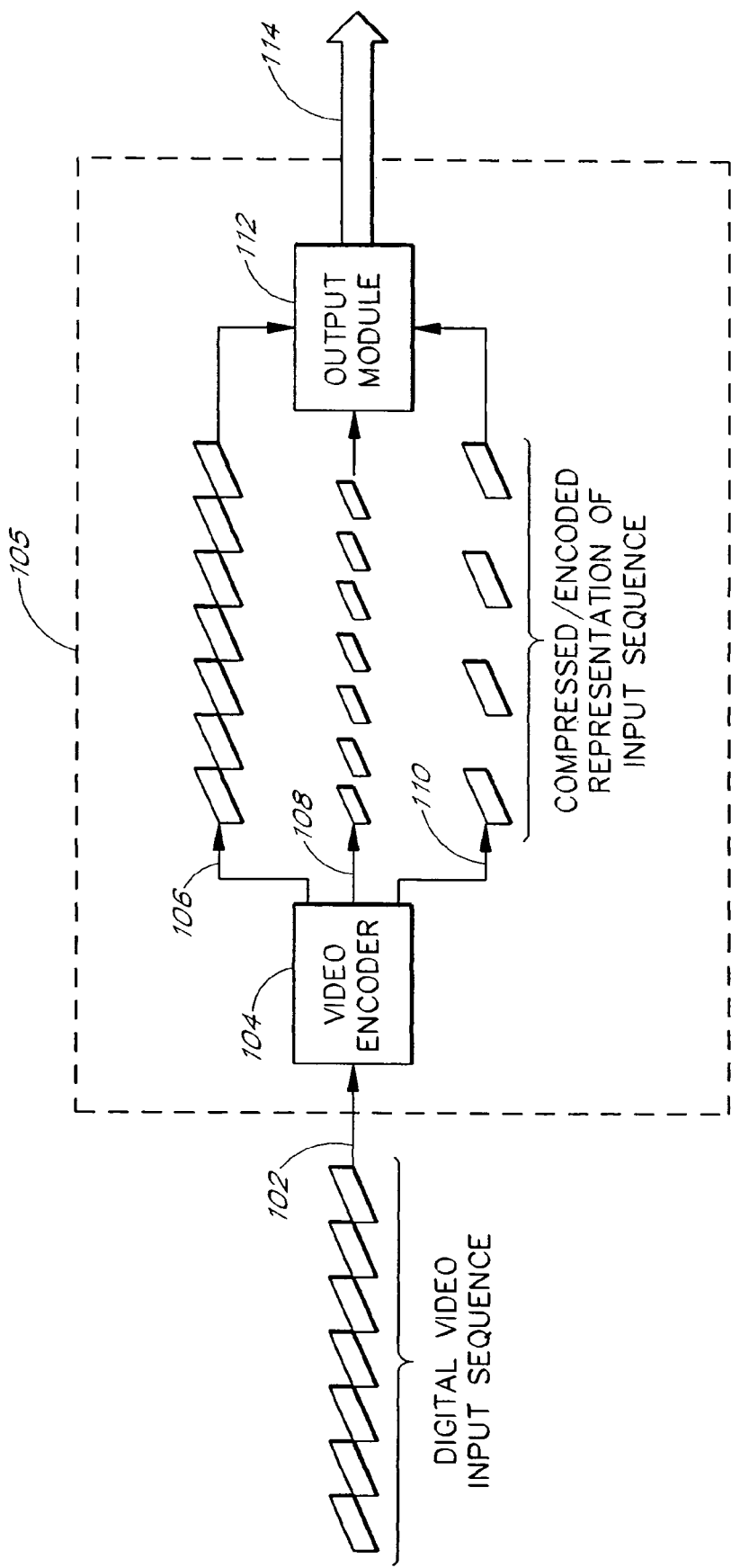
FIG. 1 illustrates one embodiment of a video encoder application.

In the following description, reference is made to the accompanying drawings, which form a part hereof, and which show, by way of illustration, specific embodiments in which the invention may be practiced. It is to be understood that other embodiments may be utilized and structural changes may be made without departing from the scope of the present invention. Where possible, the same reference numbers will be used throughout the drawings to refer to the same or like components. Numerous specific details are set forth in order to provide a thorough understanding of the present invention. However, it will be obvious to one skilled in the art that the present invention may be practiced without the specific details or with certain alternative equivalent devices and methods to those described herein. In other instances, well-known methods, procedures, components, and devices have not been described in detail so as not to unnecessarily obscure aspects of the present invention.

The detailed description that follows is organized into the following sections:
I. Definition of Terms
II. Overview of the Invention
III. System Description
IV. Stream Synchronization
V. Data Sharing During the Encoding Process
VI. Motion Vector Search Refinement
VII. Further Embodiments.

I. Definition of Terms

Media Presentation

A media presentation can consist of a video sequence including frames of digital video, an audio segment consisting of digital audio, combinations of video, graphics, text, and/or audio (multimedia), or analog forms of the aforementioned.

Representation

A representation is an encoded version of a media presentation, wherein the encoded version is encoded according to a set of encoding parameters. The encoding of a media presentation using a particular set of encoding parameters will result in a representation having distinct characteristics possibly including frame rate, bit-rate, decoding complexity, and quality.

Streaming

Streaming concerns transmitting a representation and receiving the representation for processing. The processing typically involves the decoding and presentation or playback of the representation. During streaming, the processing of the representation by the receiving system begins shortly after the transfer has begun, but before the transfer has completed. The receiving system may buffer a small amount of the representation data so that short delays or interruptions in the transmission of the representation will not result in an interruption in the processing. Thus, the rate at which the representation is transmitted typically corresponds to the rate at which the representation is processed.

Bit-rate

The bit-rate of the representation is the rate at which the representation data must be processed in order to present the representation in real time. A higher bit-rate representation of a video sequence generally comprises more data than a lower bit-rate representation of the same sequence. The most pertinent application of the bit-rate measure is in determining the rate at which the data of the representation should be streamed in order to present the representation in real time. Real-time playback of a higher bit-rate representation of a video sequence requires that the data of the representation be streamed and/or decoded at a faster rate than that required for a lower bit-rate representation of the same sequence. Thus, when streaming for real-time playback, a higher bit-rate representation requires a higher bandwidth communication link than a lower bit-rate representation.

Resolution

The number of pixels from which an image is composed, consisting of horizontal and vertical components, in numbers of pixels. Higher resolution images have higher numbers of pixels and thus contain more detail. An encoded image can have the same resolution as or a different resolution than the unencoded input image. Encoded representations with higher resolution typically have a higher bit-rate than encoded representations with lower resolution.

Quantization

Quantization generally involves representing each of a range (or step size) of coefficient valves with a single valve, such as a small integer, during encoding. Quantization allows data to be represented more compactly, but results in the loss of some data. Quantization on a finer scale results in a less compact representation (higher bit-rate), but also involves the loss of less data. Quantization on a more coarse scale results in a more compact representation (lower bit-rate), but also involves more loss of data.

Frame Rate

The frame rate is the rate at which frames are displayed upon decoding an encoded representation of a video sequence for playback. Higher frame rate representations typically result in a higher bit rate representation. A frame rate lower than that of the input sequence can be achieved in the encoded representation by skipping, or not encoding selected frames of the input sequence.

Macroblocks (MBs)

Video encoding techniques typically break up a frame of video into smaller blocks of pixels called macroblocks (MBs). Each MB can consist of a matrix of pixels, typically 16×16, defining the unit of information at which encoding is performed.

Motion Compensated Prediction

Motion Compensated Prediction uses blocks of decompressed image data from a previous or subsequent frame, displaced by a vector called a "motion vector," in order to create a close approximation to the MB to be encoded. The block of image data from the previous or subsequent frame is called a predictive MB. This technique eliminates the need to encode all of the data in the present MB. In lieu of an encoded version of the present MB, the motion vector and the difference between the current MB and the predictive MB can be encoded to produce an Inter MB. Upon the decoding of an Inter MB the predictive MB data will already be available. The predictive MB data are then used in conjunction with the motion vector to recreate the original MB.

Inter and Intra MBs

Each MB can be coded as either an Intra MB or an Inter MB. Inter MBs use the technique of Motion Compensated Prediction. Intra MBs are transform encoded without motion compensated prediction. Thus, Intra MBs do not reference decoded data from either previous or subsequent frames. In some cases, such as when one frame is simply a slight displacement of the last, MBs can be more efficiently coded as Inter MBs. In other cases, such as upon a scene transition, where the present frame shares little or no image data in common with the last, MBs can be more efficiently coded as Intra MBs.

Mode Decision

The technique of deciding whether to encode a MB as an Intra or an Inter MB is called mode decision. A number of mode decision techniques are known in the art. One such technique is described in section 3.1.1.3 "INTRA/INTER mode decision" of the TMN10.doc reference.

Intra and Inter Frames and I, P, and B-Frames

An I-frame is a frame consisting completely of Intra MBs. Thus, I-frames are encoded with no reference to previous or subsequent frames. I-frames are also known as "Intra-frames." A P-frame, standing for "predictive-coded" contains one or more Iner MBs. Thus P-frames have references to previous I or P frames. P-frames generally require less storage than I frames, but depend on information from the decoded version of the previous I or P frame to be decoded. A B-Frame, standing for "bidirectionally predictive-coded" consists of MBs that have references to previous and/or subsequent I or P frames. B-frames also require less storage than I frames, but depend on information from the decoded version of the previous and/or subsequent I or P frame to be decoded. P and B-frames are also known as "Inter-frames."

Server

A server stores representations and transmits them over a computer network to client devices that request them. A client device might be a personal computer with multimedia capabilities or another device such as a television equipped with an Internet browser accessory. A server can be used to either download or stream representations. Downloading typically involves the transfer of a representation from the server to a client.

II. Overview of the Invention

The present invention provides a system and methods for producing multiple encoded representations of a video input sequence. Each encoded representation is a version of the original sequence optimized for real-time streaming over a maximum bandwidth link. In one advantageous aspect of one embodiment, multiple representations are produced simultaneously.

In another advantageous aspect of the present invention, the multiple representations produced each contain identified synchronization frames. The synchronization frames allow a server and a client to switch between streamed representations in real time without interruption. For example, if the available bandwidth over the link connecting the server to the client changes, the server and client can switch to an encoded representation that is optimized for the new available bandwidth. The synchronization frames facilitate this switching in a seamless fashion such that frames need not be skipped or repeated and such that the user perceives no sudden interruption, jitter or pause in the displayed sequence.

The present invention may also advantageously produce a single data file containing the multiple representations. The single file contains synchronization information including data identifying locations of synchronization frames in the file for each representation. These data facilitate the server's ability to switch between streaming different representations on the fly.

In one embodiment, the present invention reuses data calculated in the encoding of one representation to encode other representations. Thus, color conversion need be performed only once per frame with the resulting data being used to encode all representations. Resampling of a color converted frame need only be performed once for each desired resolution. In certain circumstances, motion vector data calculated for one representation are used in the encoding of other representations. Also, in certain circumstances, the present invention advantageously reuses calculated transform coefficients in the encoding of multiple representations.

In another advantageous aspect, the present invention uses the motion vectors of a frame of one representation as the starting point for a search for the motion vectors of a proximate frame of another representation.

In a further aspect of the present invention, the encoded representations are stored on a storage device. The stored representations can be read by a server and streamed to decoding devices for display. Alternatively, the stored representations can be read directly from the storage medium by the decoding device for display. In another embodiment, the encoded representations are streamed directly to a decoding device.

III. System Description

FIG. 1 illustrates a video encoding system 100 in accordance with one embodiment of the present invention. The embodiment includes a video encoder application 105 comprising a video encoder 104, and an output module 112. The video encoder 104 encodes a video input sequence 102 to yield a number of encoded representations 106, 108, 110.

The output module 112 of the video encoder application 105 outputs the encoded representations 106, 108, 110 in one of a number of possible formats (not shown). The output 114 can be in an interleaved format tailored for "live" streaming of the representations 106, 108, 110 as they are encoded. The output 114 can also be in a single file format in which each representation is stored in a contiguous block within one file. This format is tailored for the "static" case in which a file is created for subsequent streaming by a server. In still another format, each representation 106, 108, 110 can be output separately. Output formats will be discussed in greater detail below.

The input sequence 102 to the encoder application 105 can be either a live signal or a prerecorded sequence in a number of possible formats. Conversions can be applied to various types of input signals such as analog video, or previously compressed video to produce an appropriate input to the video encoder application. In one embodiment, the video encoder application 105 can accept video in RGB or YUV formats. The application 105, however, can be adapted to accept any format of input as long as an appropriate conversion mechanism is supplied. Conversion mechanisms for converting a signal in one format to a signal in another format are well known in the art.

Each of the encoded representations 106, 108, 110 can be encoded using different encoding parameters. For example, representation 106 might be a compressed representation using the same frame rate and resolution as the input sequence 102. Representation 108 might be a compressed representation using the same frame rate but a different quantization and a lower resolution. Representation 110 might use the same quantization and resolution as representation 106, but at a lower frame rate.

The present invention accomplishes several objectives by encoding a video input sequence to yield several representations. One objective is to provide the ability to stream multiple representations to multiple clients over transmission links of variable bandwidths for decoding and display in real-time. Clients connected through higher bandwidth connections will be capable of receiving higher bit-rate representations. Clients limited to lower bandwidth connections will be limited to receiving lower bit-rate representations.

Another objective in providing multiple representations is adaptability to decoding systems having varying degrees of processing power. For example, two representations having the same bit-rate can require different amounts of processing power to decode. A representation with a higher frame rate but a coarser quantization will require more processing power to decode than a representation with a lower frame rate and a finer quantization. Thus, a low end processing machine with a high bandwidth connection would be better suited to receiving the low frame rate representation in lieu of the high frame rate representation with a comparable bit rate.

Another objective in producing multiple encoded representations is the consideration of storage space. When a client downloads a representation for subsequent playback, constraints on available storage space, in addition to constraints on communications bandwidth or desired download time may dictate the bit-rate of the representation that can be downloaded.

Figure 2:
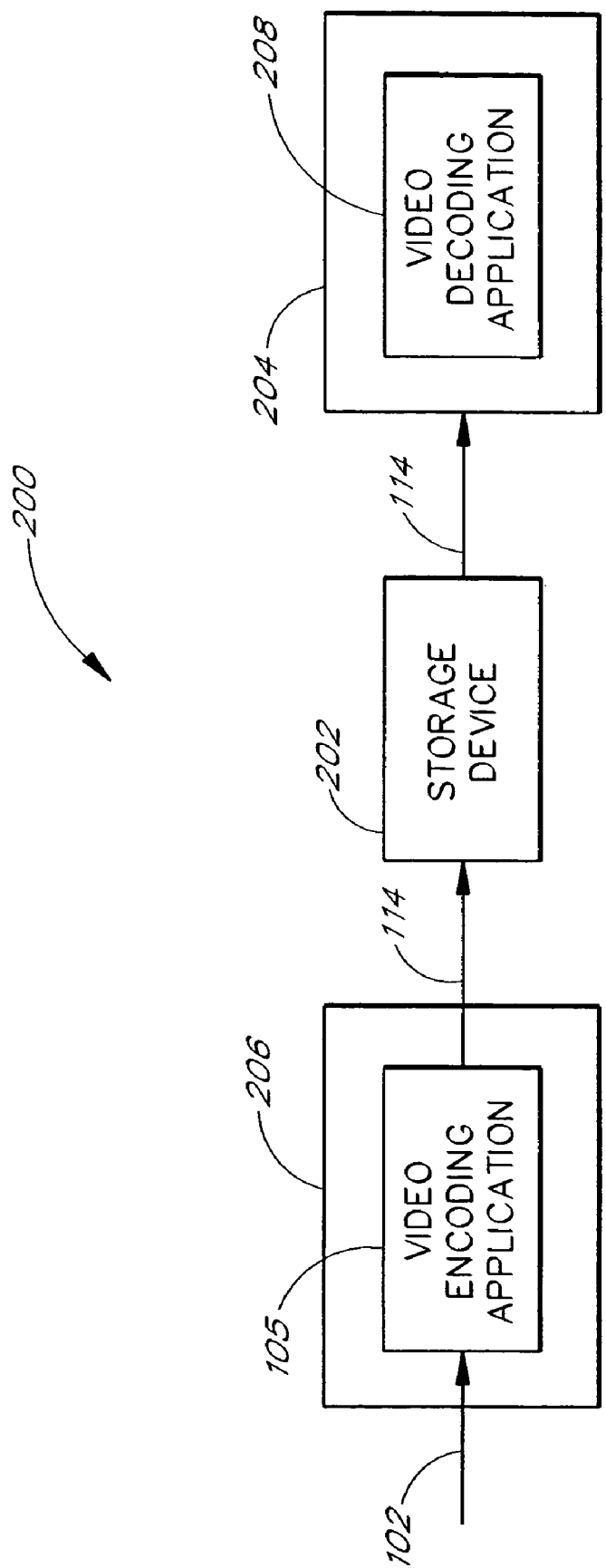
FIG. 2 illustrates one embodiment of a system including video encoder application.

FIG. 2 illustrates one embodiment of a system 200 in which the video encoding application 105 is run on a computer 206. The video encoding application 105 sends the output 114 to a storage device 202, which could be a video server, a hard disk drive, CD rewriteable drive, a read/write DVD drive, or any other device capable of storing and allowing the retrieval of encoded video data. The storage device 202 is connected to another computer 204 via a direct connection (e.g., serial, parallel, etc.) or via a network connection such as a LAN, WAN, Internet, or the like. A video decoding application 208, running on the computer 204, can then read the output 114 and decode one of the encoded representations contained therein. As the decoder application 208 decodes one of the encoded representations, it generates a reproduction of the video input sequence 102 on a display of the computer 204. In an alternative embodiment, the storage device 202 employs removable media. In this case, the medium, (e.g. CD or DVD) can be replicated and distributed.

Figure 3:
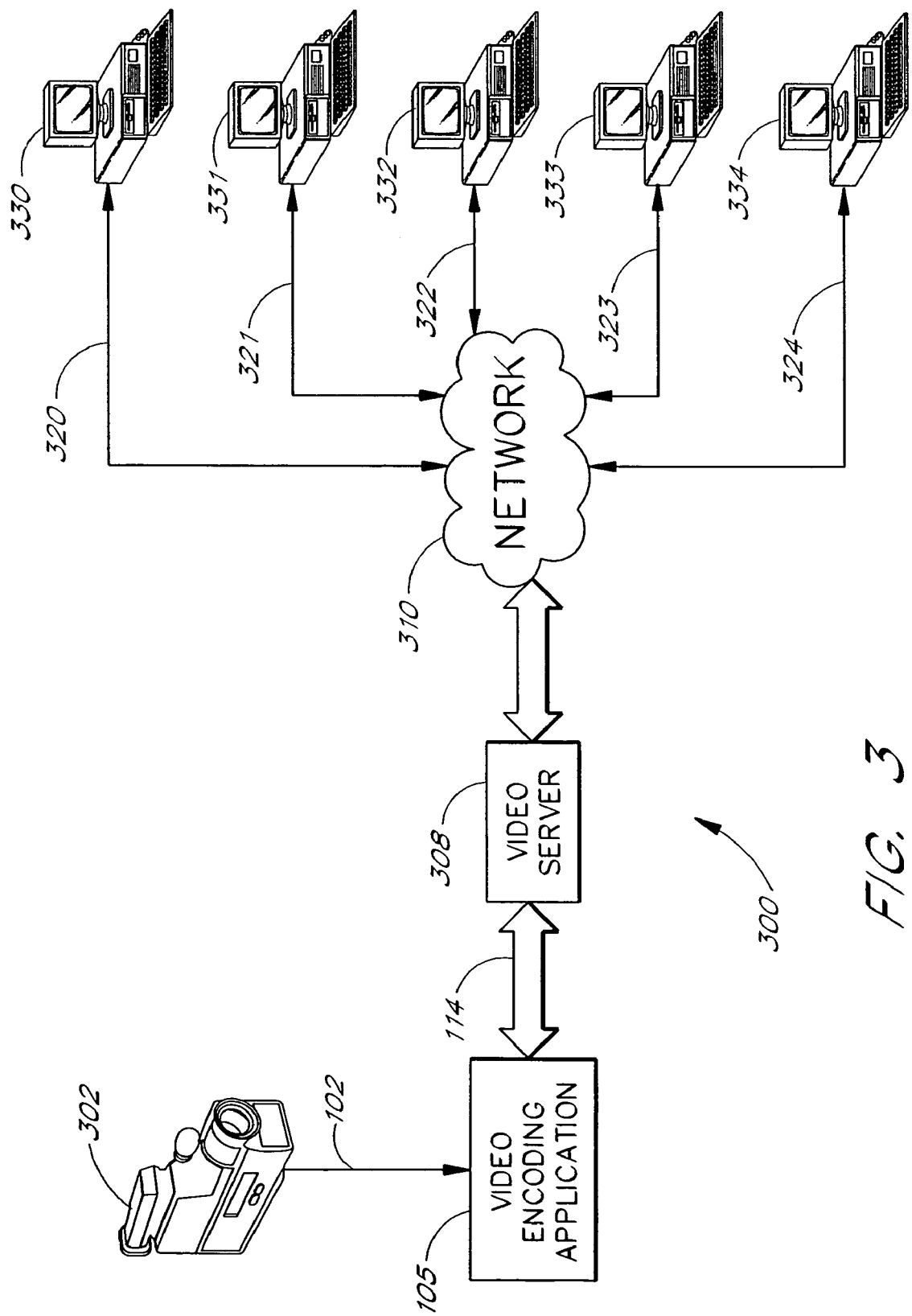
FIG. 3 illustrates another embodiment of a system including video encoder application.

FIG. 3 illustrates another system 300 in accordance with the present invention. A video capture device 302 such as a video camera supplies a video input sequence 102. The sequence 102 is directed as input to the video encoding application 105, which encodes the input sequence 102 to yield a number of representations. The application 105 creates output 114 including the representations, which is then transferred to a video server 308 for subsequent processing. Upon demand by client computers 330-334, the server 308 processes the output 114 to extract and stream the encoded representations 320-324 over a network 310 such as the Internet.

In one embodiment, the application 105 can output a number of representations in real time in a "live" mode. The application 105, in this case, can be run directly on the video server 308. Alternatively, the application 105 can be run on one computer with the output 114 being streamed directly to the video server 308 through a computer network. As the application 105 produces the output 114, the server 308 streams one of the encoded representations 320-324 to each client computer 330-334 simultaneously in real-time.

In another embodiment, the video server 308 can distribute complete copies of the output 114, produced in a static mode as opposed to live, to other video servers. The other video servers can then complete the process of extracting representations from the output 114 and streaming the representations to client computers 330-334.

Aspects of the systems illustrated in FIGS. 2 and 3 can be combined and supplemented to achieve other embodiments. Numerous other implementations are consistent with the scope of this invention. Such other implementations need not be restricted to video, but may include audio or other forms of media as well.

A. Object-oriented Embodiment and Data Organization

One embodiment of the present invention utilizes an object-oriented encoder application 105. The object-oriented encoder application 105 can be implemented in a programming language such as, for example, C++, which provides for object-oriented programming.

Figure 4:
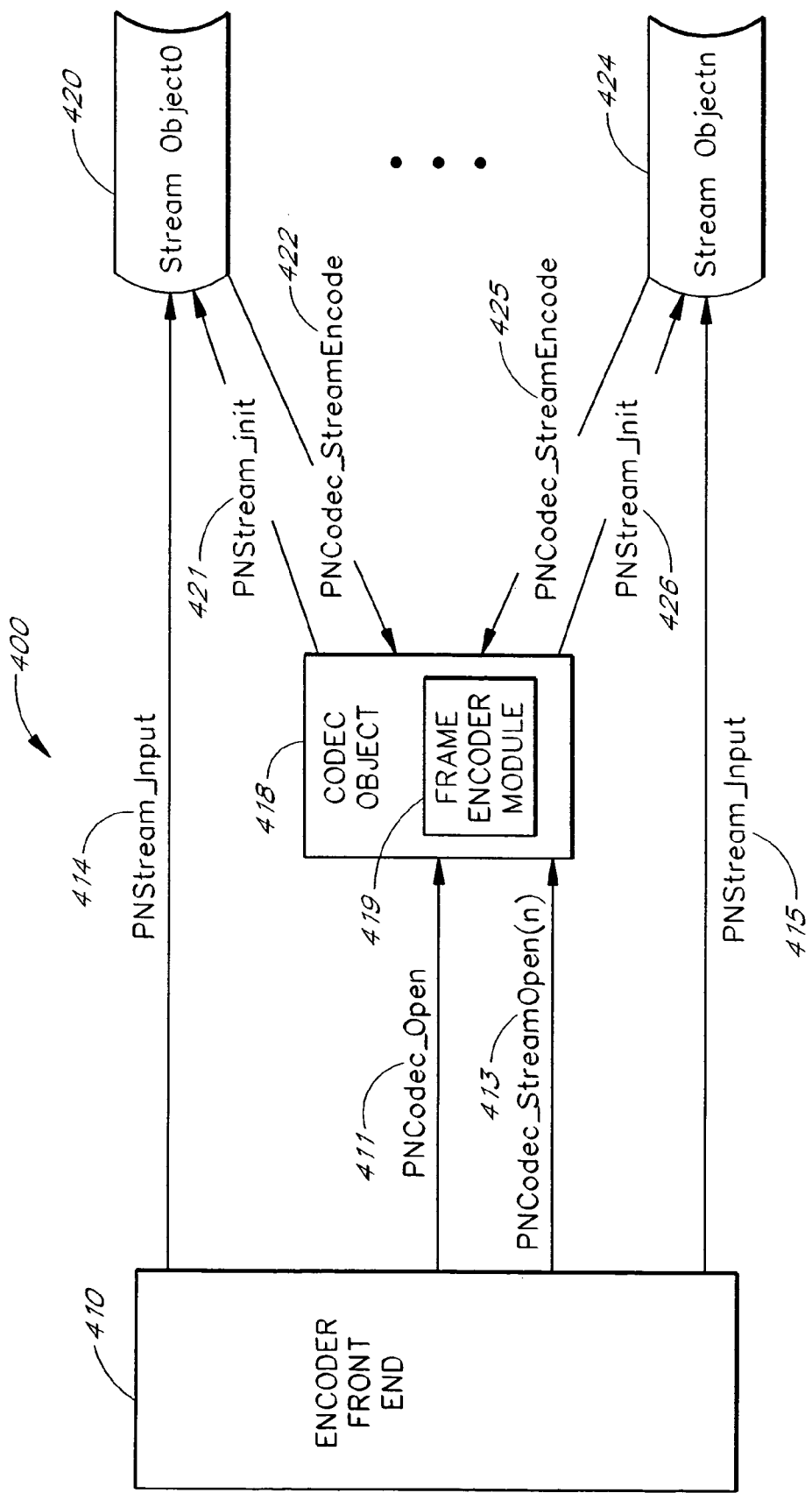
FIG. 4 illustrates an object-oriented embodiment of the encoder application.

FIG. 4 illustrates one embodiment of the object-oriented encoder 400. The object-oriented encoder 400 consists of an encoder front end 410, a codec (coder-decoder) object 418, and a number of stream objects 420, 424 each of which stores information for encoding a respective representation. The codec object 418 includes a frame encoder module 419 that performs basic encoding operations such as calculating discrete cosine transform (DCT) coefficients, searching for motion vectors, and quantization in accordance with methods that are well known in the art.

Figure 5:
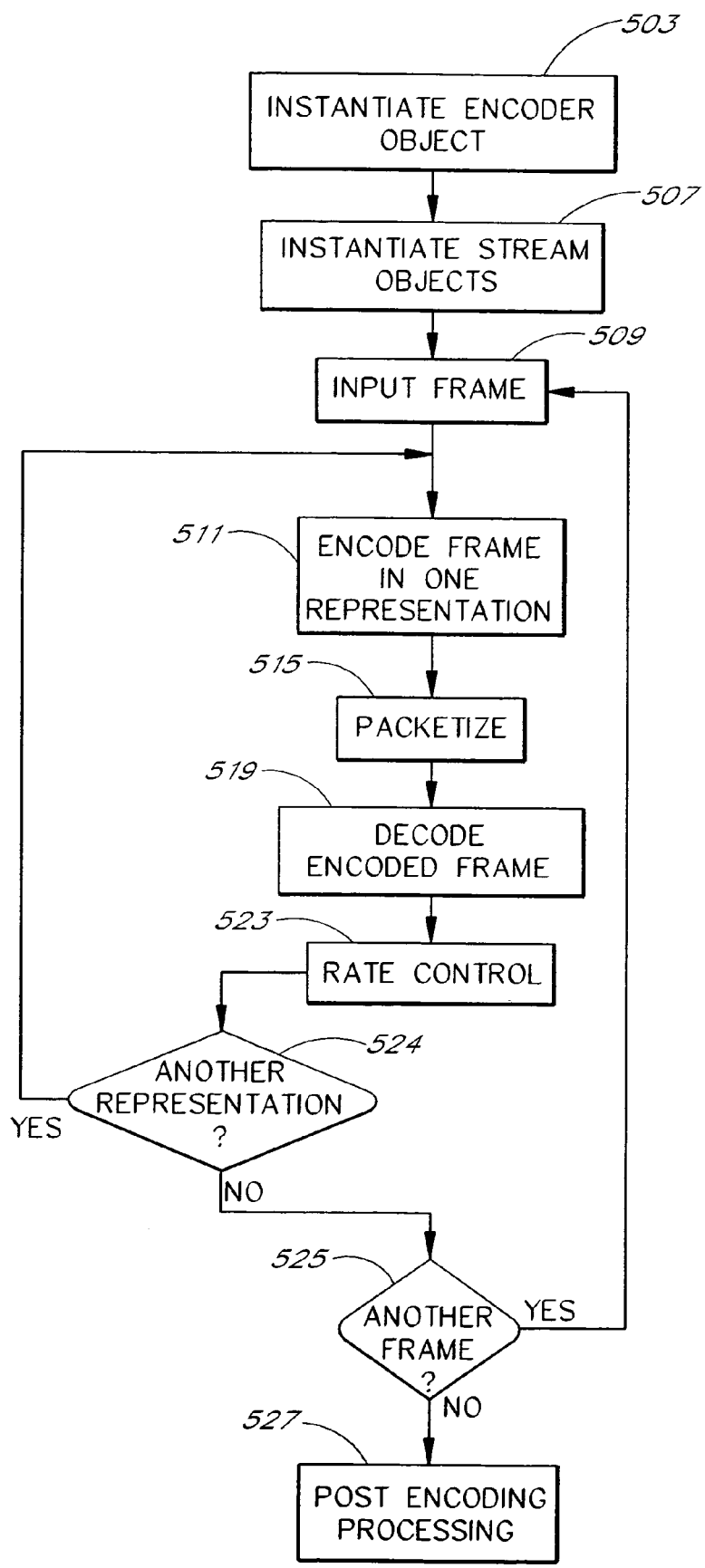
FIG. 5 illustrates a flowchart of the high level functionality of the encoder application.

FIG. 5 illustrates a high-level flowchart of the process of creating the objects of the object-oriented encoder 400 and of the process of encoding the input sequence 102. At a step 503, the encoder front end 410 calls a PNCodec_Open routine 411 to instantiate the codec object 418. At a step 507, to create stream objects 420, 424, the encoder front end 410 calls a PNCodec_StreamOpen routine 413, passing the number of the stream to be created as the argument. The codec object 418, in turn, instantiates the stream objects 420, 424 by calling a PNStream_Init routine 421, 426, also at the step 507. Two stream objects, Stream Object0 420 and Stream Objectn 424 are shown in FIG. 4. It will be appreciated that the present invention is not limited by a number of streams.

Once all of the objects have been instantiated, the processing of the input sequence 102 can begin. At a next step 509, the encoder front end 410 loads a frame of the input sequence into a buffer called an InputFrameBuffer. Once an input frame is loaded, the encoder front end 410 calls the stream object method PNStream_Input 414, 415 of each of the stream objects 420, 424. The PNStreamInput method 414, 415 of each stream object in turn calls the PNCodec_StreamEncode 422, 425 method of the codec object 418, also at step 509.

Once each stream object has called the PNCodec_StreamEncode 422, 425 method of the codec object 418, the codec object 418 begins the actual encoding process by performing steps 511, 515, 519, and 523 for each representation. At the step 511, the codec object 418 encodes the current frame for a representation associated with one stream object. This step will be discussed in greater detail in sections below.

At a next step 515, the codec object 418 calls a packetize routine (not shown) of the encoder front end 410. The packetize routine organizes encoded data for a representation into packets suitable for transmission. In one embodiment, the packetize routine accumulates encoded frame data in memory until there is a sufficient amount of data to create a packet. The packetize routine can also append information to a packet such as time stamps, sequence numbers, frame identification numbers, the number of frames in the packet or whether the packet only contains a partial frame. The packetize routine is called by the codec object 418 after the encoding of a frame for a representation is completed in the step 511. It will be appreciated that, in an alternate embodiment, the packetize routine could be called once, after a frame is encoded for all representations, wherein the packetize routine packetizes encoded frames for all representations.

At a further step 519, the codec object 418 decodes the encoded frame. As will be appreciated by those of ordinary skill, the decoded version of the frame is required for motion compensated prediction (motion vector calculation) of subsequent frames.

At a step 523, the codec object 418 calls a rate control routine for the present representation. The rate control routine determines the appropriate encoding parameters to ensure that the encoded representation maintains a target bit-rate. The rate control routine sets a variable EncodeFrame, stored within each stream object, to indicate whether to encode the next frame. The routine also sets a variable, Quant, to indicate the level of quantization for the next encoded frame. In setting these variables, the rate control algorithm can take into account a number of factors comprising the current bit-rate averaged over a moving temporal window, the current frame rate, and the current level of quantization. The tmn10.doc Sections 8 and 9 present rate control methods commonly used in the art.

At step 524, the codec object 418 determines whether there are additional representations for which the current frame must be encoded and processed. If so, control is passed back to step 511 and steps 511, 515, 519, and 523 are repeated for the next representation. Once the current frame has been encoded and processed for all representations at step 524, the codec object 418 passes control to step 525.

At step 525 the codec object 418 determines whether there is another input frame to process. If so, control is passed back to step 509 for the input of another frame. The sequence of steps 509, 511, 515, 519, 523, 524, 525 repeats until all of the input frames have been encoded for all the representations. If, at step 525, there are no more input frames to process, control is passed to step 527 at which point any post encoding processing is accomplished. In the static case, when a file is produced for subsequent streaming, step 527 can include formatting the encoded representations and writing synchronization information, which will be discussed below, to an output file. In the dynamic or "live" case, step 527 can include sending an "end of stream" indication.

Figure 6:
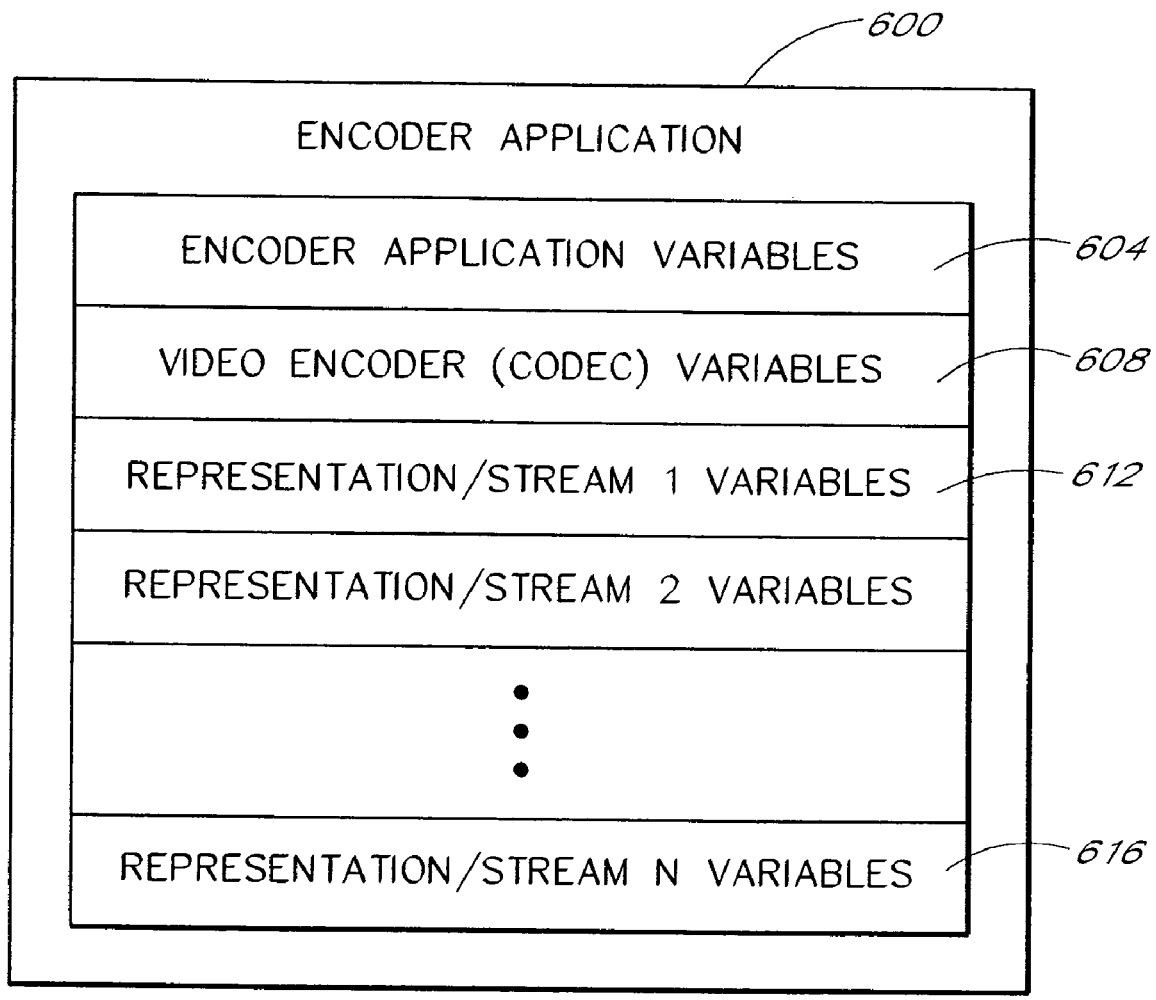
FIG. 6 illustrates the execution environment in which the encoder application references variables.

The video encoder application 105 uses a number of data structures and variables in the encoding process. FIG. 6 illustrates the organization of variables within an execution context 600 of the video encoder application. The encoder application variables 604 store data such as user settings. User settings can include, for example, whether the encoder is operating in "live" or "static" mode, the desired target bit-rates and the source of the input stream. In one embodiment, the encoder application variables 604 are stored local to the encoder front end 410.

The PNCodecOpen routine 411 routine initializes and allocates a number of variables and buffers 608 for holding calculated data that can be shared among multiple representations during the encoding process. In one embodiment, the buffers are accessed through an array of pointers. The video encoder variables and buffers 608 store transitory data that are used during the encoding of each frame. The transitory data can include buffers for holding color converted input frame data, resampled input data, DCT coefficients, and motion vectors. In one embodiment, the video encoder variables 608 are stored local to the codec object 418.

Each representation also has a set of stream variables and data structures 612, 616 that store data specific to the representation itself. In one embodiment, the PNStream_Init routine 421, 426 initializes variables for each stream object 420, 424. The variables can store values such as, for example, the EncodeFrame variable, discussed above, characteristics of each representation such as resolution, quantization parameters, and target bit rate. The variables can also store values such as the number of bits used in the encoded representation so far—the "bit expenditure balance." The stream variables 612, 616 can be stored local to the corresponding stream objects 420, 424.

B. Encoded Frame Contents

Figure 7:
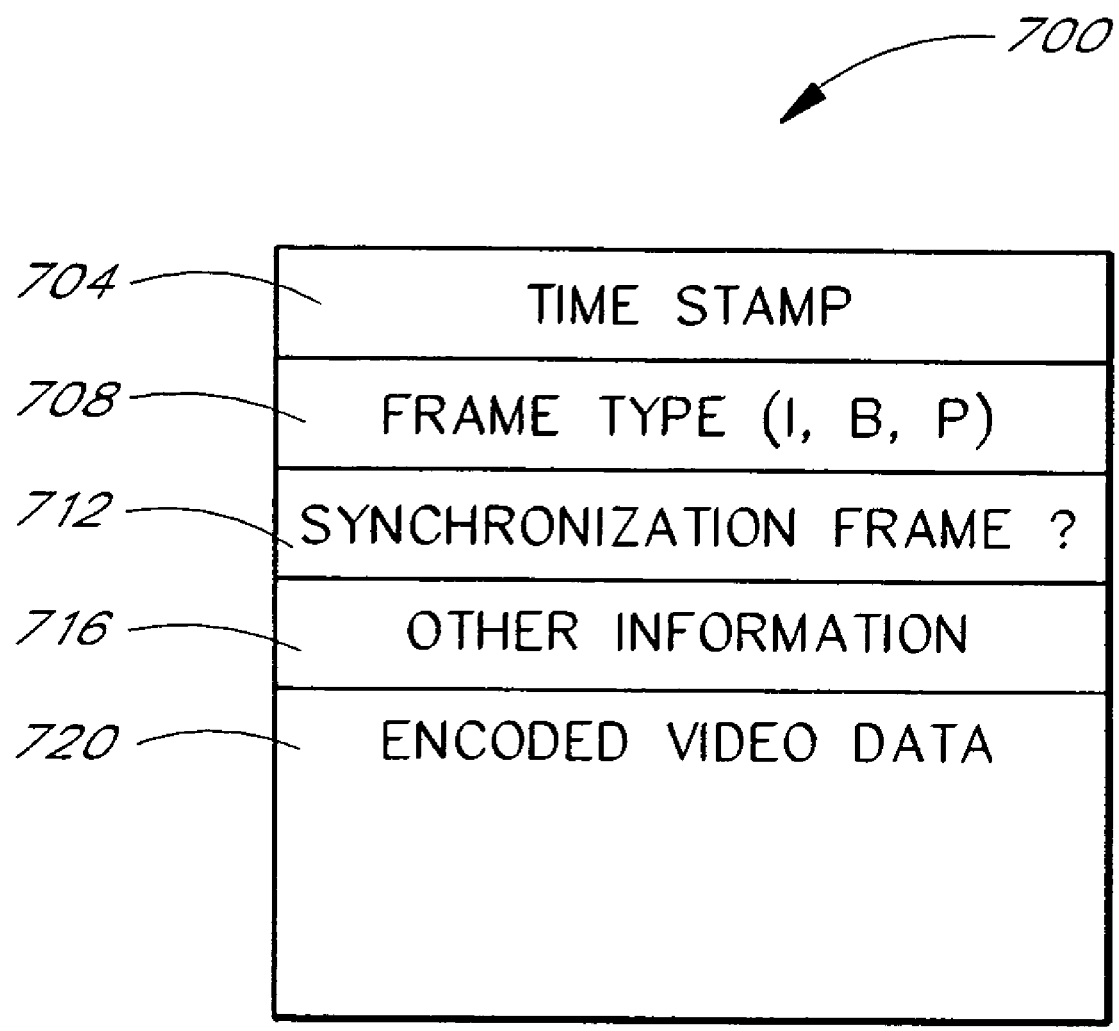
FIG. 7 illustrates the contents of a typical encoded frame.

FIG. 7 illustrates some of the data that are typically included in an encoded frame 700. The frame 700 includes a time stamp 704 indicating its temporal location in the representation. In one embodiment, the time stamp is represented by a value indicating the number of milliseconds elapsed since the beginning of the video sequence. It will be appreciated that other time stamp formats may be used.

The frame 700 also includes the frame type 708, e.g. Intra-frame, Inter-frame or I, P, or B-Frame. In one embodiment of the present invention, a boolean value, which could be simply a single bit, indicates an Intra-frame when set, and an Inter-frame when not set. Those of ordinary skill in the art will appreciate that other variables of different format could indicate the frame type.

A synchronization frame bit 712, which can be a boolean value, can be set to indicate a synchronization frame and not set to indicate no synchronization frame. Other information 716 relevant to the particular encoding method used, such as, for example, the resolution of the representation, can be included in addition to the encoded data 720.

IV. Stream Synchronization

In addition to providing a number of encoded representations of an input sequence, the present invention also advantageously provides for synchronization between the different representations or streams. The synchronization of the different encoded representations allows a decoder application to switch among representations read from an output file or received over a network from a server without an interruption in the presentation. The synchronization also allows a server to switch between the representations streamed to a client with no interruption in the transmission.

Referring to FIG. 2, it may be the case that the computer 204 is running several other processes while decoding and displaying one representation contained in the output 114. Suppose the processor of the computer 204 (FIG. 2) becomes overburdened and is not able to decode the present representation concurrently with the processor demands of the other processes. A representation with a lower frame rate, for example, could, however, be decoded given the demands of the other processes and the available processing power. To smoothly switch from receiving and decoding one representation to receiving and decoding another representation presents the problem of synchronizing the cessation of the decoding of the one representation and the commencement of the decoding of the other representation.

The need for synchronization is similar in a network context. Suppose the available bandwidth between the server 308 (FIG. 3) and the client computer 330 suddenly decreases. It may be the case that an encoded representation being streamed has a bit-rate too high to be effectively transmitted given the decreased bandwidth of the connection. To continue streaming the same representation would lead to breakup, delay, and jitter. As an alternative, the output 114 contains a lower bit-rate representation, which is available to the server for transmission and which is tailored for a lower bandwidth connection. Nevertheless, to switch between the two representations requires their synchronization.

One aspect of the present invention advantageously synchronizes representations having different bit rates. Thus, the present invention facilitates on-the-fly switching between representations during the process of streaming or decoding.

A. Synchronization Frames

In one embodiment, the synchronization of the multiple representations is accomplished through the use of synchronization frames. Synchronization frames are encoded frames identifying synchronization points at which switching between representations can take place. Each synchronization frame in one representation has corresponding synchronization frames in each of the other representations. In one embodiment, the synchronization frames of all encoded representations correspond in time and have substantially the same time stamp. During the decoding and presentation of one representation, its synchronization frames are presented at the same times (temporal locations) that the corresponding synchronization frames in another representation would have been presented.

As synchronization frames correspond in time in all representations, a switch between representations can be synchronized. Once the frame before a synchronization frame has been decoded in one representation, the synchronization frame can be taken from a different representation. There will be no discontinuity in the decoded sequence, because all synchronization frames correspond in time and share the same time stamp.

Figure 8:
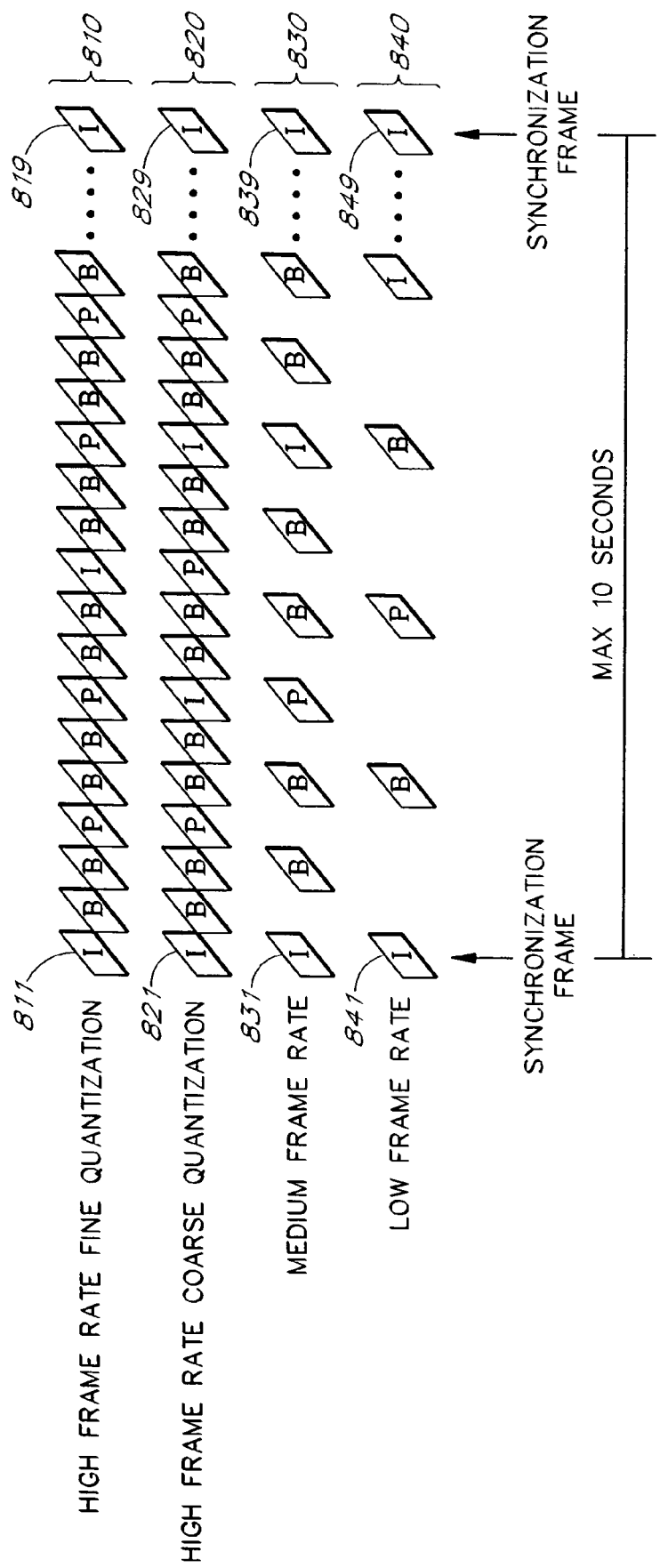
FIG. 8 illustrates segments of several encoded representations of a video sequence.

FIG. 8 illustrates segments 810, 820, 830, 840 of four encoded representations of a video sequence that could be included in an output 114 of one embodiment the present invention. The first segment 810 has a high frame rate and a fine level of quantization. The second segment 820 has the same frame rate as the first 810, but a more coarse level of quantization. The third segment 830 has an even lower frame rate, while the fourth segment 840 has the lowest frame rate. The bit-rates go from highest for the first segment 810 to lowest for the last segment 840.

The segments 810, 820, 830, 840 illustrated in FIG. 8 comprise I, B, and P-frames, which are well known in the field of digital video encoding. It will be noted that, in FIG. 8, second segment 820 follows a different sequence of I, B, and P-frames than the first segment 810. It will also be noted that the process of determining the sequence of I, B, and P-frames in the normal course of encoding a particular representation, otherwise known as mode selection, is not within the scope of this invention and will not be discussed in detail herein. The present invention is thus not limited by any process for determining I, B or P-frames.

The first set of synchronization frames depicted in FIG. 8 includes frame 811 in the first segment 810, frame 821 in the second segment 820, frame 831 in the third segment 830, and frame 841 in the last segment 840. The synchronization frames 811, 821, 831, and 841 all correspond in time and have substantially the same time stamp relative to the beginning of a real time presentation representing the original input video sequence 102 (FIG. 1). A second set of synchronization frames 819, 829, 839, and 849 is shown at the far right if the segments 810, 820, 830 and 840. A transition from any segment to any other segment during the decoding process may advantageously be made at a time stamp corresponding to either set of synchronization frames.

The time line at the bottom of FIG. 8 shows that, in one embodiment, a maximum of ten seconds of encoded video is permitted between synchronization frames. In other embodiments, the time limit between synchronization frames can be varied to suit the requirements of the specific application. The time limit (temporal period) between synchronization frames dictates the maximum time delay before a decoder receiving one representation can transition to receiving another representation. Under more time critical conditions or situations where conditions vary quickly, this time could be decreased accordingly. In situations where network conditions are less likely to vary, for example, the time between transition points could be increased.

In one embodiment, the synchronization frames are created by forcing an input frame to be encoded as an Intra-frame in each encoded representation. Thus, the mode selection process is temporarily overridden. A synchronization frame is also created if an input frame is encoded, in the normal course of encoding each representation, as an Intra-frame in each encoded representation. Such a situation will usually occur upon scene transitions in the input sequence.

B. Output Format for Synchronized Streams

Figure 9:
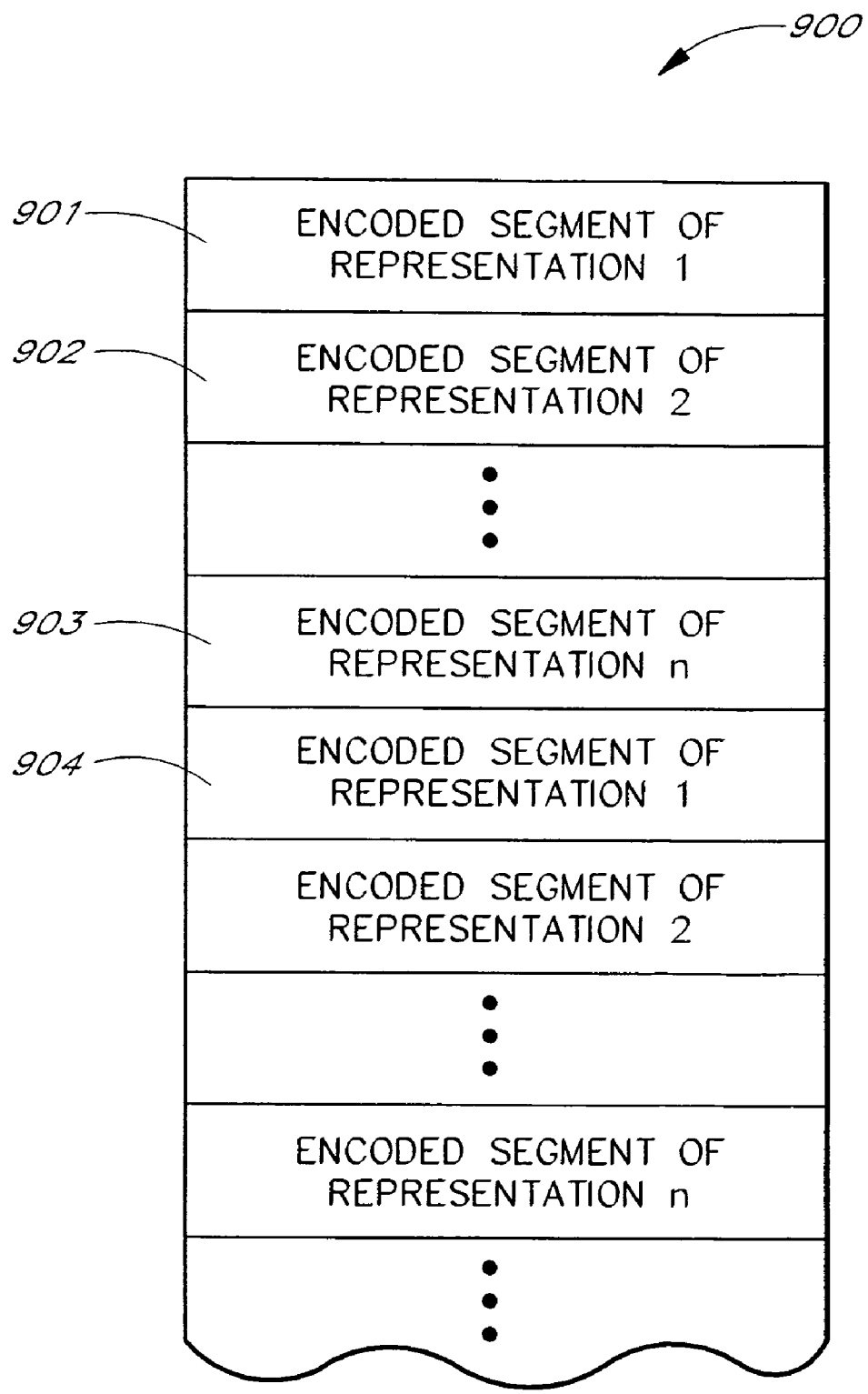
FIG. 9 illustrates the format of the encoder application output in a "live" mode.

The present invention can operate in different output modes, namely live and static. In the live case, the application produces a number of encoded representations interleaved into a single output stream. As illustrated in FIG. 9, for example, the output stream 900 comprises interleaved segments from each representation. In one embodiment each segment includes one frame of one representation. Segment 901, for example, can include one frame from a first representation. Subsequent segment 902 can include one frame from a second representation, which corresponds substantially in time to the frame in segment 901 of the first representation. Other segments follow until a frame of the last representation 903 is output. At this point, another frame of the first representation 904 follows.

Output in the format depicted in FIG. 9 can be easily processed by a server to stream multiple output streams in real time, each conveying a single representation. In one embodiment, each encoded frame contains information indicating the representation with which it is associated. The representation indicating information can be stored in the other information portion 716 of the encoded frame, described above. A server can then use the representation indicating information to identify and extract individual streams from the interleaved output stream 900.

In an alternative embodiment, each segment can contain a portion of a complete frame or a number of complete frames. In this case, the identifying information can be incorporated once in each segment, preferably at the beginning of the segment, so as to allow the server to associate each segment with its proper representation.

In one embodiment, segments are incorporated into packets by the packetize function, described above. Packets are tailored for transmission over computer networks. Each packet can include a header containing the byte size of the payload, a description of the payload (synchronization frame, partial frame, full frame, multiple frames), a representation with which the packet or packets are associated, and the packets' associated time stamp(s).

Given the identifying information associating each segment with a particular representation, a server can dynamically switch between the representations that it transmits. In one embodiment the server can accomplish such a switch in real time by searching the interleaved output stream 900 for a synchronization frame from a different representation. Upon finding a synchronization frame in a new representation, the server can discontinue streaming the current representation at the last frame before the corresponding synchronization frame in the current representation. At this point the server can proceed by streaming data from the new representation starting with the new synchronization frame. Generally, the server makes such a switch upon a request from a client for a stream having different characteristics or upon determining that bandwidth conditions associated with a link to a particular client have changed. It will be noted that there exist several known methods of coordinating communications between a client and a server that could be used to coordinate such a transition. It will further be noted that the present invention shall not be limited by a particular manner of coordinating and effectuating a transition among representations between a client and a server.

In the static case, as opposed to the live case, the application produces an output file rather than an output stream, for subsequent processing by a server. In one embodiment, the output file can be created by writing the same output stream that is produced in the live case to a file. Thus, the output file would have the format depicted in FIG. 9. A server can then process the file as it processed the output stream in the live case.

Figure 10:
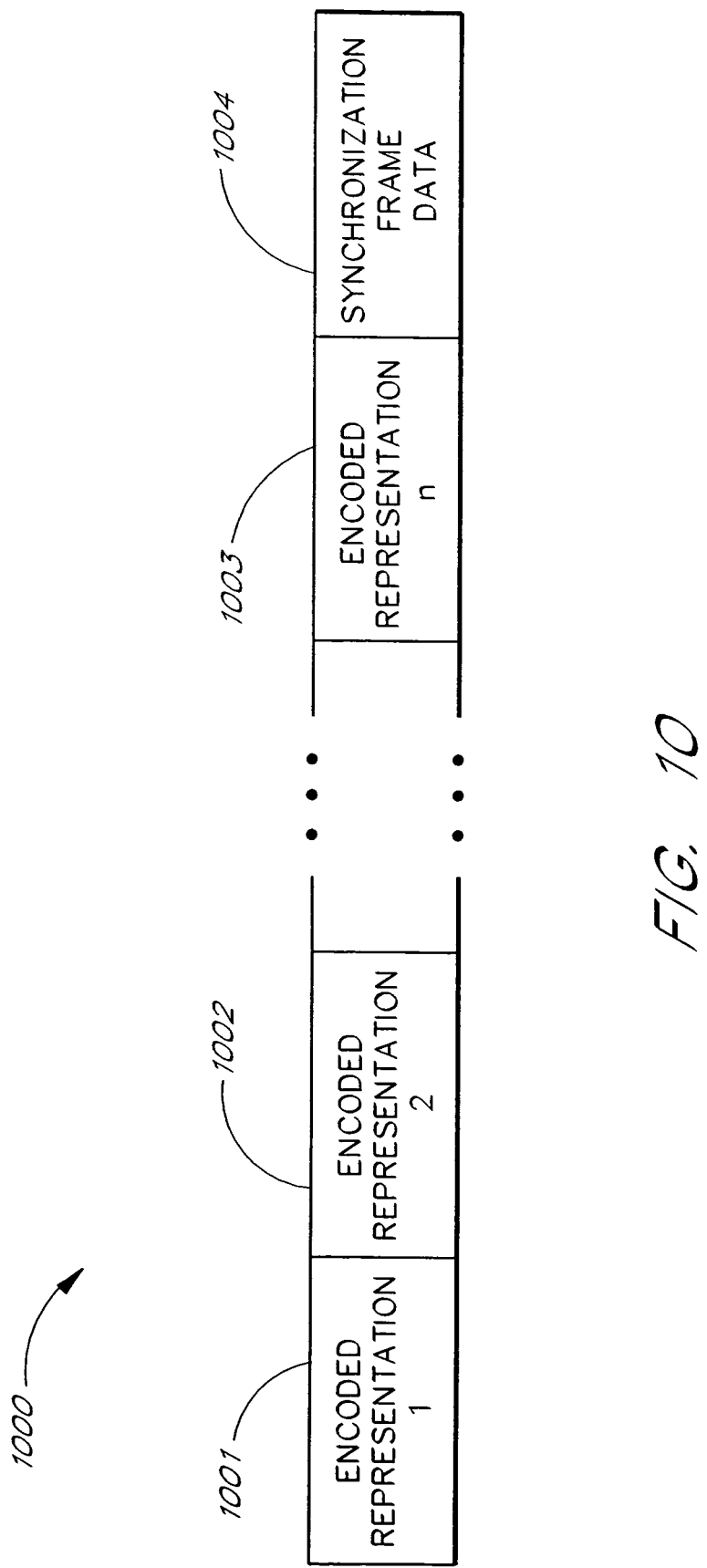
FIG. 10 illustrates the format of the encoder application output in a "static" mode.

In another embodiment, the application can produce an output file 1000 wherein each stream is stored in a contiguous block. As illustrated in FIG. 10, the encoded representations 1001, 1002, 1003 are each stored in a contiguous block. By using this format, a video server can output a single representation with far fewer disk accesses. Advantageously, synchronization between streams is facilitated by synchronization data included in the file.

To switch between representations, a server locates a synchronization frame in a new representation corresponding in time to an upcoming synchronization frame in the representation being currently decoded. To enable a server to locate a synchronization frame in another representation, a block of synchronization frame data 1004 is appended to the output file 1000. The block of synchronization frame data 1004 includes the time stamp and location within the file for each synchronization frame of each representation. In one embodiment, the location consists of an offset from the beginning of the file. By searching the synchronization frame data 1004 using the time stamp, the server is able to identify the location of a corresponding synchronization frame in another representation within the output file 1000. To accomplish the switch, the server stops processing the current representation from the output file 1000 at a point just before the upcoming synchronization frame, and begins processing the output file 1000 starting at the location of the new synchronization frame. The coordination of a switch among representations between a client and a server can be accomplished in the same manner as in the live case.

C. Synchronization Frame Creation

Figure 11B:
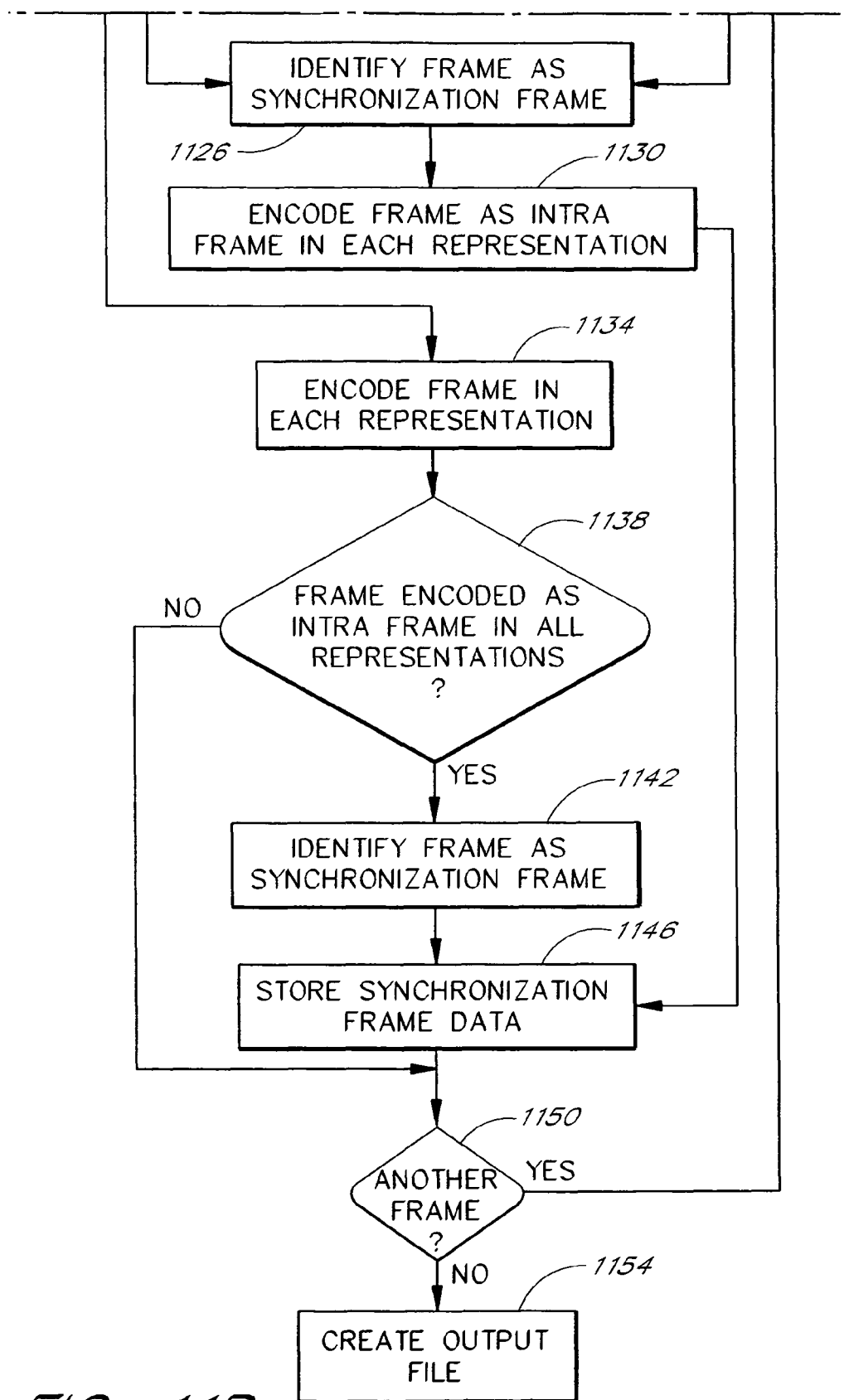

FIG. 11 is a flowchart illustrating steps performed in one embodiment of the present invention to synchronize representations using synchronization frames in the static case. The live case is a simplified version of the static case and will be discussed at the end of this section. In the present embodiment, a synchronization frame is created when an input frame is encoded as an Intra-frame in all representations. Under some circumstances, a synchronization frame is forced by encoding the input frame as an Intra-frame in all representations. When an input frame is encoded as an Inter-frame in one or more representations during the natural course of encoding, the encoded frame is not a synchronization frame.

At a step 1102, the encoder front end 410 inputs a frame from the input sequence 102. As will be appreciated by those of ordinary skill, each frame of the input sequence 102 has a time stamp indicating its temporal location in the sequence. At a step 1106, the codec 418 subtracts the time stamp of the last coded synchronization frame from the time stamp of the present frame to determine whether a maximum allowable time between synchronization frames has been exceeded. The codec 418 stores the time stamp of the last encoded synchronization frame during a subsequent step 1150.

If, at the step 1106, the maximum allowable time has been exceeded, then control passes to a step 1126. At the step 1126 the codec 418 forces a synchronization frame by setting a ForceIntraFrame flag, one of the video encoder variables 608. In order to create a synchronization frame, the ForceIntraFrame flag indicates that the current frame is to be encoded as an Intra-frame in all representations.

At a step 1130, the encoding process begins and the codec 418 encodes the current frame as an Intra-frame in each representation. When the application is operating in static mode, the codec 418 also appends the encoded frame to a temporary file in which each representation is stored, during the step 1130. The codec 418 accomplishes the encoding process through a number of well-known techniques that are executed through calls to the frame encoder module 419. A more detailed explanation of one embodiment of the encoding process will be presented in the next section.

Once the codec 418 encodes the current input frame as an Intra-frame for all representations, control passes to a step 1146. At the step 1146, the codec 418 stores the time stamp of the synchronization frame and its location within each representation to a temporary file for later use in generating the synchronization frame data 1004 needed for static mode operation. The stream objects 420, 424 each have a continuously updated variable StreamSize, one of the stream variables 612, 616, that stores the size (data length) of the encoded stream up to the present frame. The StreamSize variable indicates the location of each synchronization frame within the representation. At the step 1146, the codec 418 calculates the size of the encoded frame and adds the size to the StreamSize variable for each stream object. It will be appreciated that the size of the encoded frame may differ for each steam object, given the different encoding characteristics associated with each stream object.

At a step 1150, if there is another input frame to be processed, the codec 418 returns to the step 1102. On the other hand, if all of the input frames have been processed and the application 105 is operating in static mode, control is passed to a step 1154. At the step 1154, the output module 112 generates the output file 1000 by concatenating the temporary files in which each representation is stored and writing them to the output file. At this point in the step 1154, the output module 112 determines the final location of each synchronization frame within the output file by adding its location within a representation, as stored in the step 1146, to the location of the beginning of the representation within the output file. The output module 112 then stores the calculated location of each synchronization frame along with its time stamp to the synchronization frame data section 1004 of the output file 1000.

Returning to the step 1106, if the maximum allowable time between synchronization frames has not been exceeded, control passes to a step 1110. At the step 1110, the codec 418 determines whether the time since the last synchronization frame is approaching the maximum time between synchronization frames. In a preferred embodiment, this "approaching" time limit is set to be 90% of the maximum time between synchronization frames.

At this point it will help to introduce the concept of a master representation. When multiple representations are being encoded, the master representation is typically the representation with the highest bit rate and most fine level of quantization. Upon decoding, the master representation will typically result in a more accurate representation of the input sequence 102. When a frame is encoded as an Intra-frame in the master representation as a matter of course, it is likely that the remaining representations would also encode the frame as an Intra-frame as a matter of course. Thus, once the time since the last synchronization frame has exceeded the "approaching" limit, the codec object 418 will force a synchronization frame if the current frame is encoded as an Intra-frame in the master representation. The codec object 418 forces the synchronization frame by encoding the current frame as an Intra-frame in the remaining representations as will now be described.

At a step 1110, if the time since the last synchronization frame has exceeded the "approaching" time limit, control passes to step 1114. At a step 1114, the codec 418 makes calls to the frame encoder module 419 to encode the current frame in the master representation. The encoding of the current frame in the master representation at step 1114 results in either an Inter or an Intra-frame and the encoded frame is identified as one or the other. At step 1118, the codec 418 determines whether the current frame has been encoded as an Intra-frame in the master representation. If the current frame has been encoded as an Intra-frame, then control passes to step 1126 where the codec identifies the current frame as a synchronization frame by setting the ForceIntraFrame variable. At this point, the process proceeds as already described above. In this case, the current frame has been already encoded as an Intra-frame in the master representation. Therefore, the codec 418 needs only encode the current frame as an Intra-frame in the remaining representations at step 1130.

Returning to the step 1118, if the current frame has not been encoded as an Intra-frame in the master representation, then control passes to a step 1134 for the encoding of the current frame in the remaining representations. Returning to step 1110, if the time since the last synchronization frame is not approaching the maximum time, then the codec 418 also passes control to the step 1134 for the encoding of the current frame in all the representations.

At the step 1134, the codec encodes the current frame as either an Intra or an Inter-frame in each remaining representation. After the frame is encoded, control passes to a step 1138 at which point the codec 418 determines whether the frame was encoded as an Intra-frame in all the representations. If the current frame was encoded as an Intra-frame in all representations, the codec 418 passes control to the step 1142 and identifies the frame as a synchronization frame by setting the ForceIntraFrame flag. The process then proceeds from the step 1146 as already described above. At the step 1138, if the current frame is not encoded as an Intra-frame in all representations, then control passes to step 1150 for the processing of another frame as described above.

The process by which synchronization frames are selected and identified has been described above for the static case. When the process operates in a live mode to produce an interleaved output stream, some of the steps in the above-described process can be modified or skipped. At step 1146, no location data for synchronization frames need be calculated or stored. Only the time stamp of the last synchronization frame need be stored so that the time since the last synchronization frame can be calculated. Step 1154 can be eliminated altogether since an output stream, rather than the output file, is continuously output during the encoding process. The encoding steps 1114, 1130, 1134 are also modified so that the encoded frames are stored in memory until they are output rather than being written to temporary files. An additional step can also be added to the process just before step 1150 to format the interleaved output stream from the encoded frames. This step can be performed as part of the packetize step 515 discussed above under the subheading "Object-oriented Embodiment and Data Organization."

As will be appreciated by one of ordinary skill in the art, the steps illustrated in the present flowchart of FIG. 11 can be integrated in the steps illustrated in the higher level flowchart of FIG. 5.

V. Data Sharing During the Encoding Process

Figure 12B:
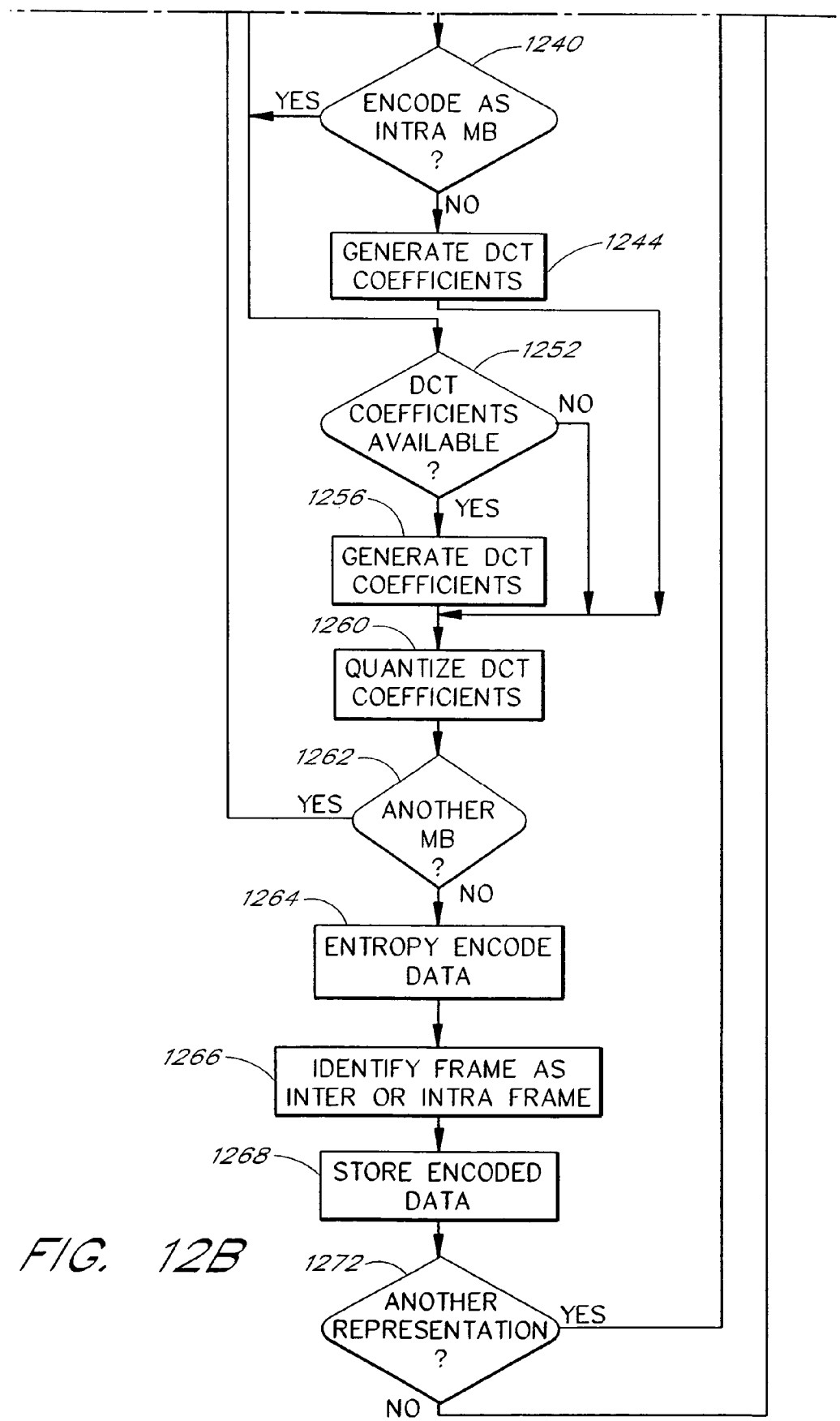

Once data are encoded for one representation, the reuse of the data may permit more efficient encoding of additional representations. As will be discussed below, data sharing allows some encoding steps to be performed only once for two or more of the encoded representations. FIG. 12 is a flowchart illustrating a high level representation of steps performed in accordance with one embodiment of the present invention to share data during the encoding of multiple representations.

A. Data Sharing During Color Conversion

In one embodiment of the present invention, frames are encoded as either Intra or Inter-frames. The encoding process for the multiple encoded representations begins with the input of an unencoded frame at a step 1202 of FIG. 12 (similar to the step 1102 of FIG. 11). At a next step 1208, the codec object 418 checks the EncodeFrame variable in each stream object 420, 424 to determine whether the current frame will be encoded in any representation. If, at step 1208, the EncodeFrame variable is not set for any of the representations, step 1202 is repeated, and the next unencoded frame is input.

The input frame is typically in an RGB format, which comprises the intensities of the red, green, and blue components of each pixel. The RGB format consists of three color components. The RGB format is not ideal for encoding purposes as the human eye is not as sensitive to color as it is to luminance. Consequently, color components need not be represented as accurately as luminance components.

YUV format, a known format for representing video data, consists of three components: (Y), a luminance component, and (U) and (V), two chrominance components. The U and V components, however, are typically represented at half the resolution of the Y component, thus taking advantage of the eye's higher sensitivity to luminance than chrominance. The YUV format allows an image to be represented with less data than an apparently comparable RGB image.

If, in the step 1208, the EncodeFrame variable is set for at least one representation, the frame encoder module 419 converts the RGB input frame to YUV format in accordance with techniques well known in the art at a step 1212. Once the color conversion has been performed the codec 418 stores the color converted frame data in a YUVInputFrameBuffer, one of the codec variables 608. The codec 418 can then use the converted frame data to complete the encoding of the frame for both the current and remaining representations, rather than performing the color conversion again.

B. Data Sharing During Resampling

Each representation is encoded at a particular resolution, which may or may not be the same resolution as the input frame. If the desired resolution of the encoded representation is different than the resolution of the input frame, then the input frame must be resampled to the desired resolution of the encoded representation.

The frame encoder module 419 performs the resampling in accordance with techniques well known in the art. In a next step 1216 of the encoding process, the codec 418 determines whether a color-converted frame of the proper resolution is available for the current representation. A proper resolution frame is available if the desired resolution is the same as the input frame or if a resampling to the desired resolution has already been performed for another representation. If a proper resolution frame is available, then control passes to a step 1224. If a proper resolution frame is not available, then the frame encoder module 419 resamples the input frame at step 1220 and stores the resampled data in a YUVResampledInputFrameBuffer, one of the codec variables 608. It will be appreciated that when multiple representations have differing resolution characteristics, the present invention allocates a buffer to hold the resampled data, called YuVResampledInputFrameBuffer, for each different resolution. In this manner, resampled frame data are advantageously made available to subsequently encoded representations of corresponding resolution. After step 1220 completes, control is passed to the step 1224.

C. Data Sharing During Macroblock Encoding

Steps 1224 through 1262 of the flowchart in FIG. 12 comprise a loop in which each MB is encoded. The first subsubsection below titled "Sharing of Motion Vector Data" describes the encoding of Inter MBs while the second subsubsection titled "Sharing of DCT Coefficients" describes the encoding of Intra MBs. Once each MB has been encoded as either an Inter or an Intra MB by the steps 1224 through 1262, control is passed to steps 1264, 1268, and 1272. Steps 1264 through 1272 are described in the following subsection titled "Final Frame Processing."

1. Sharing of Motion Vector Data

A step 1224 is the first step that is performed for each MB rather than for each frame. At the step 1224, the codec 418 checks the ForceIntraFrame flag (see "Synchronization Frame Creation" above). If the ForceIntraFrame flag is set, the codec encodes each MB as an Intra MB in order to produce an Intra-frame by passing control directly to step 1252. Step 1252 will be discussed in the next subsubsection. If the ForceIntraFrame flag is not set, then the codec 418 attempts to encode the MB as an Inter MB starting at a step 1228.

At the step 1228, the codec 418 determines whether applicable motion vector data are available for the current MB. If applicable motion vector data are not available, the frame encoder module 419 calculates motion vector data at a step 1232 and stores the data in a ShareMVDataBuffer, one of the codec variables 608. By storing the data, the data are made available for use in encoding MBs of subsequent representations as well as the present MB. If, at the step 1228, the codec 418 determines that applicable motion vector data are available, it passes control to a step 1236, which will be discussed below, advantageously skipping the compute intensive motion vector search step 1232.

At the step 1232, the frame encoder module 419 performs a motion vector search on one MB of the current frame. This step is one of the most compute intensive steps in the video encoding process, and substantial savings can be gained if it can be eliminated in some cases as is advantageously done in accordance with the present invention. The step 1232 determines the predictive motion vector that identifies the location of the best match to the current MB in a decoded version of the previous frame. In one embodiment of the present invention, the frame encoder module 419 calculates the motion vector in accordance with well-known techniques, for example, the technique described in section 3.3 "Fast Search Using Mathematical Inequalities" of the TMN10.doc document.

The criteria for determining whether applicable motion vector data are available can be varied depending upon the desired results of the encoding process. More stringent requirements will likely result in better compression, while less stringent requirements will share more data and increase computational efficiency. In one embodiment, motion vector data are deemed applicable when the data have been already calculated in the encoding of a representation with an identical frame rate and resolution. In another embodiment, the motion vector data are deemed applicable when the quantization of the current representation is more coarse than the quantization of the representation for which motion vector data have already been calculated. By using the motion vector data for more finely quantized representations, more accurate motion vectors are obtained and reused for less accurate representations with increased computational efficiency.

Once an applicable motion vector has been identified or a new motion vector calculated, the frame encoder module 419 performs a difference MB calculation at the step 1236. The motion vector associated with the current MB identifies a predictive MB in the previous frame. At the step 1236, the difference between the predictive MB and the current MB is calculated to produce a difference MB.

At a step 1240, the frame encoder module 419 examines the difference MB to determine whether the current MB should be encoded as an Intra MB. The frame encoder module 419 uses an existing technique, such as that described in section 3.1.1.3 "INTRA/INTER mode decision" of the TMN10.doc reference, to make this decision. If, at the step 1240, the frame encoder module 419 decides that the MB should continue to be encoded as an Inter MB, then control passes to a step 1244. Alternatively, if the frame encoder module 419 decides that the MB should be encoded as an Intra MB, then control passes to a step 1252, which will be discussed in the next subsubsection.

At a step 1244 the frame encoder module 419 generates DCT coefficients for the difference MB, which involves a transform of the difference MB into another domain. As will be appreciated by one of ordinary skill in the art, techniques now exist for transforming a MB (or difference MB) by applying a discrete cosine transform (DCT) to generate DCT coefficients. It will be further appreciated that other transforms could be applied, such as wavelet transforms, and the present invention is not limited by any form of transform applied to convert MB information. Upon completion of step 1244, control passes to a step 1260. The step 1260 and the steps that follow will be described in the next subsubsection.

As will be appreciated by those of ordinary skill in the art, the motion vector search calculations, such as those performed in the step 1232, represent a substantial portion of the processing involved in the video encoding process. Advantageously, the present invention increases computational efficiency by reusing motion vector data and bypassing motion vector search calculations during the encoding of certain frames.

2. Sharing of DCT Coefficients

Returning to the step 1240, if the frame encoder module 419 decides that the MB should be encoded as an Intra MB, then control passes to the step 1252. Control is also passed to the step 1252 if the ForceIntraFrame flag is set at step 1224 as described in the previous subsection.

At the step 1252, the codec 418 determines whether applicable DCT coefficients are available for the current MB. If applicable DCT coefficients are available, a step 1256 is bypassed, and control is passed to the step 1260, which will be discussed below. If applicable coefficients are not available, the frame encoder module 419 calculates the DCT coefficients at the step 1256 and stores the coefficients in a ShareDCTCoeffsBuffer, one of the codec variables 608. By storing the coefficients, they are made available for the encoding of subsequent representations as well as the present representation. In this manner, data can be shared in the encoding of two or more representations, and, in bypassing the DCT coefficient calculation step, computational efficiency is increased.

As will be appreciated by one of ordinary skill in the art, techniques now exist for transforming a MB (or difference MB) by applying a discrete cosine transform (DCT) to generate DCT coefficients. It will be further appreciated that other transforms could be applied, such as wavelet transforms, and the present invention is not limited by any form of transform applied to convert frame information. In encoding an Intra MB, motion compensated prediction need not be performed and no difference MB need be calculated. Therefore, the DCT is performed directly on the current MB as stored in the YUVInputFrameBuffer or the YUVResampledInputFrameBuffer to generate DCT coefficients.

In one embodiment, DCT coefficients for a previously encoded representation of the current MB are deemed applicable when the previous representation shares the same resolution as the representation being encoded. In this case, the calculated DCT coefficients for the two representations would be identical, and so the DCT coefficients from the first representation are reused in the second. This requirement may be relaxed or modified in other embodiments to achieve other results. For example, the DCT coefficients of a representation with a higher resolution could be downsampled for use in a representation with a lower resolution.

Once the DCT coefficients have been calculated at step 1256, control is passed to the step 1260. At the step 1260 the frame encoder module 419 quantizes the DCT coefficients according to predetermined quantizer step sizes to generate quantized values for each coefficient, wherein the quantized values require less storage to represent than the corresponding coefficient values. Quantization is known in the art, and the present invention is not limited by any method for quantizing coefficients.

At a step 1262, the frame encoder module determines whether all of the MBs have been processed. If MBs remain to be processed then control passes back to the step 1224. If, at the step 1262, the frame encoder module 419 has processed all of the MBs of the current frame, control passes to a step 1264, which will be discussed in the next subsection.

As will be appreciated by those of ordinary skill in the art, the transform coefficient calculations, such as those performed in the step 1256, represent a substantial portion of the processing involved in the video encoding process. Advantageously, the present invention increases computational efficiency by reusing transform coefficients and bypassing transform coefficient calculations during the encoding of certain frames.

D. Final Frame Processing

At the step 1264, the encoder module 418 entropy encodes the quantized coefficients of the MBs and any other necessary frame data, such as the motion vectors, in order to represent the quantized values in a more storage-efficient manner. In one embodiment, the entropy encoding step 1264 operates on each MB until all of the MBs of the frame are processed. Various techniques for entropy coding are known in the art, and the present invention is not limited by any entropy coding technique.

Beginning with the step 1266, the encoding steps again operate on frames rather than individual MBs. At a step 1266, the codec 418 identifies the present frame as either an Inter-frame or an Intra-frame. In one embodiment, a frame will be identified as an Intra-frame if all MBs have been encoded as Intra-MBs for that frame. If one or more MBs have been encoded as Inter MBs, then the frame will be identified as an Inter-frame. At a step 1268, the entropy encoded frame is stored for subsequent processing, such as that described in connection with the steps illustrated by FIG. 11.

At a step 1272, the codec 418 determines whether there remains another representation to be encoded and, if so, it returns control to the step 1216. If all representations have been encoded, then the codec 418 returns control to step 1202 for the input of another frame.

Steps represented in the flowchart of FIG. 12 can be integrated into the higher level flowchart of FIG. 11. Step 1114 corresponds to steps 1208 through 1268 of the flowchart of FIG. 12. Steps 1208 and 1212 need only be performed once for each frame upon being incorporated into step 1114 and can be skipped on encoding subsequent representations as a color converted YUV frame is already available. Steps 1130 and 1134 each correspond to steps 1208 through 1272. Upon performing the step 1130, the ForceIntraFrame flag will be set, and step 1224 will ultimately cause the current frame to be encoded as an Intra-frame in all representations.

VI. Motion Vector Search Refinement

In one embodiment of the present invention, motion vectors from one representation are used as the motion vectors for other representations. In another embodiment, previously calculated motion vectors are used as the starting point for a search for motion vectors for a subsequently encoded representation. In this manner the search for motion vectors is refined and simplified.

Figure 13:
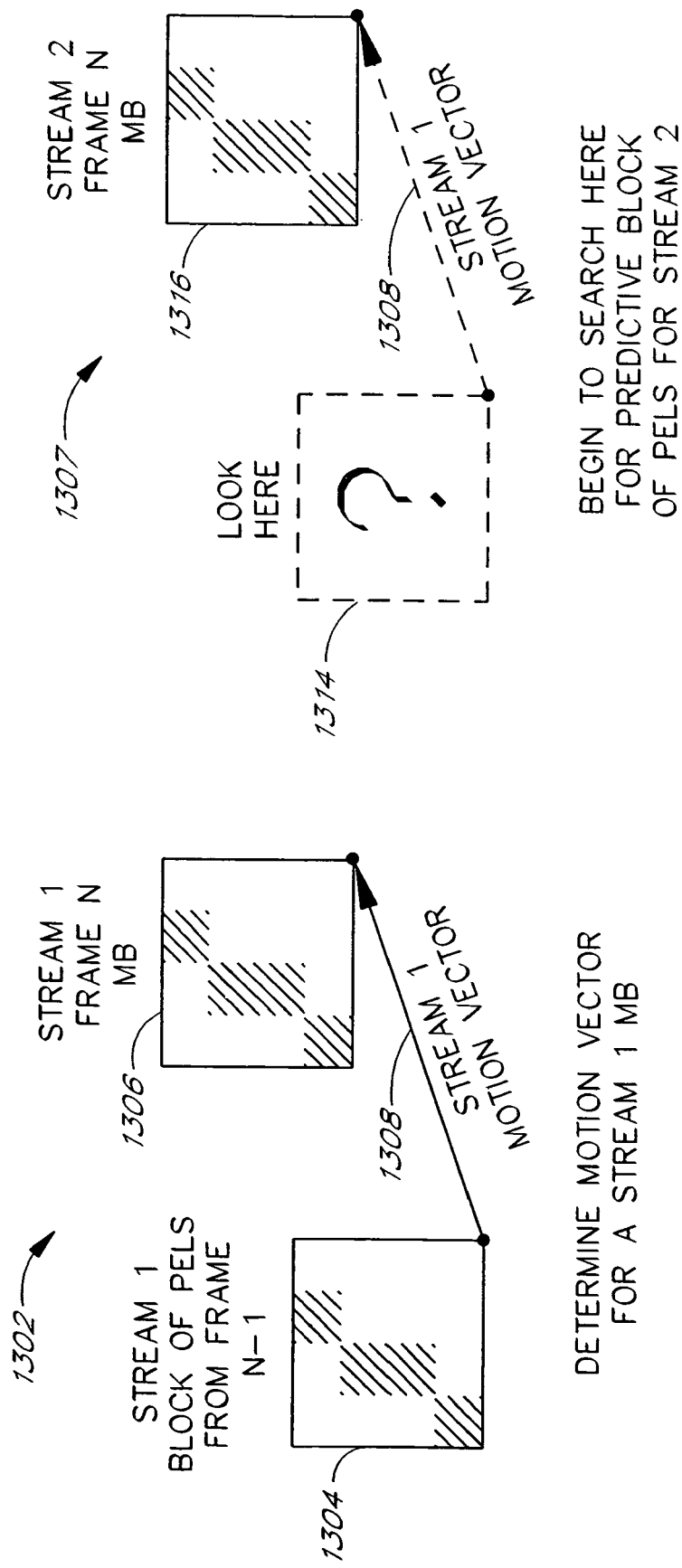
FIG. 13 illustrates the process of reusing motion vectors to refine a subsequent motion vector search.

FIG. 13 depicts the process of using previously calculated motion vectors as a starting point for a search for motion vectors of a subsequent representation. A first diagram 1302 shows the result of a search for a motion vector for a single MB 1306 of the current frame N in a stream 1. The MB 1304 in frame N–1, which most closely corresponds to the MB 1306 in frame N, differs in location within the frame by the stream I motion vector 1308. This MB is called the predictive MB.

A second diagram 1307 shows that, in calculating the motion vector for a MB 1316 of frame N of stream 2, the stream 1 motion vector 1308 can be used as a starting point for the search for the location of a predictive MB 1314 within frame N–1 of stream 2. In one embodiment, the stream 1 motion vector is used to begin a ½ pixel (PEL) refining search for the predictive MB 1314. The use of the stream 1 motion vector 1308 simplifies the search for the stream 2 motion vector substantially over starting from scratch.

In another embodiment, this motion vector search refinement can be extended to bi-directional motion compensated prediction in the calculation of motion vectors for B-frames as well as for P-frames. In this embodiment, motion vectors predictive MB displacement between the current frame N and a subsequent anchor frame N+1 for one stream could be used to refine the search for the motion vectors of another stream.

VII. Further Embodiments

Numerous additional embodiments are contemplated within the scope of this invention. The synchronization aspects of this invention can be applied in the context of encoding multiple representations of digital audio. The data sharing aspects of this invention may also be applicable in the encoding of digital audio. The synchronization aspects can also be applied to various other forms of media. Other forms of media may not be represented in the form of frames, and in such cases, synchronization points could be identified. The synchronization points would serve to identify points in a representation at which switches to or from the representation could be effectuated. Synchronization points, in this case, would serve the same purpose as synchronization frames.

In a further embodiment of encoding multiple representations of digital video, data sharing can be performed on B-frames as well as I and P-frames. In another embodiment, an alternative transform, such as a wavelet transform, may be applied to the input frames or difference frames. In still other embodiments, the conditions for the sharing of transform or motion vector data can be made more or less stringent to achieve other efficiencies.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed. It is intended that the scope of the invention be limited not by this detailed description but by the claims appended hereto.

What is claimed is:

1. A method of producing a plurality of encoded representations of an input media signal, the method comprising:
providing the input media signal to an encoder;
encoding said input media signal with said encoder to generate the plurality of encoded representations of the input media signal, wherein at least a portion of the media signal is included in a first encoded representation of said plurality of encoded representations and the same portion is also included in a second encoded representation of said plurality of encoded representations, and said first encoded representation is encoded according to a different set of encoding parameters than is said second encoded representation; and
designating and identifying a plurality of synchronization points within each of said encoded representations of the input media signal such that switching between a decoding of one of said encoded representations and another of said encoded representations can be performed without any substantial discontinuity.

2. The method of claim 1, wherein each of said encoded representations can be decoded independently of any other encoded representation.

3. The method of claim 1, wherein each of said encoded representations can be decoded starting at said synchronization points.

4. The method of claim 1, wherein a temporal period between any two adjacent synchronization points does not exceed a specified maximum temporal period.

5. The method of claim 1, wherein each synchronization points corresponds to a substantially similar temporal location within each of the encoded representations.

6. The method of claim 1, wherein said input media signal comprises a video input sequence, wherein said video input sequence comprises frames of digital video, and wherein said synchronization points correspond to encoded frames of digital video.

7. The method of claim 6 further comprising:
identifying a frame in said input sequence;
encoding said identified frame to produce an encoded frame of a first encoded representation, wherein a decoding of said encoded frame of said first encoded representation does not require a decoded version of another frame; and
identifying said encoded frame of said first encoded representation as corresponding to a synchronization point.

8. The method of claim 1, wherein at least a portion of each of said encoded representations is generated before any encoded representation is completely generated.

9. A series of executable instructions embodied in a tangible computer-readable medium which, when executed by a computer processor, causes the processor to:
- accept an input media signal;
- encode said input media signal to generate a plurality of encoded representations of the input media signal, wherein at least a portion of the media signal is included in in a first of the plurality of encoded representations and said portion is included in a second of the plurality of the encoded representations and the first of the plurality of encoded representations is encoded according to a different set of encoding parameters than the second of the plurality of encoded representations; and
- indicate a plurality of synchronization points within each of the encoded representations of the input media signal such that switching between a decoding of the first of said encoded representations and the second of said encoded representations can be performed without any substantial discontinuity.

10. A system for producing a plurality of encoded representations of a media presentation, comprising:
- a source, operable to provide a media presentation; and
- an encoder coupled to the source, the encoder configured to receive said media presentation and to generate a plurality of encoded representations of said media presentation, wherein at least a portion of the media presentation is included in one of the plurality of encoded representations and said portion is included in another one of the plurality of encoded representations and said encoder encodes at least two of the representations according to a different set of encoding parameters, and wherein the encoder is further configured to designate a plurality of synchronization points within each of said encoded representations of the media presentation such that switching between a decoding of one of said encoded representations to another of said encoded representations can be performed without any substantial discontinuity.

11. The system of claim 10, wherein each synchronization point corresponds to a substantially similar temporal location within each of the encoded representations.

12. The system of claim 10, further comprising a storage device configured to store said encoded representations.

13. The system of claim 10, further comprising a server configured to transmit at least one of said encoded representations over a communications network for presentation, said server responsive to a transition signal to switch from transmitting one of said encoded representations to transmitting another of said encoded representations to a client without a substantial interruption in said presentation.

14. The system of claim 10, further comprising a decoder configured to decode a frame preceding a synchronization point in one of said encoded representations, then to decode a frame corresponding to the synchronization point in another of said encoded representations.

15. A video encoding system comprising:
- a host computer;
- a digital video input sequence;
- output comprising a plurality of independent encoded representations of said digital video input sequence, wherein each representation is encoded according to a different set of encoding parameters, wherein at least a portion of the media signal is included in one of the plurality of encoded representations and said portion is included in another one of the plurality of encoded representations, and wherein each encoded representation contains synchronization frames identifying locations at which a switch from a decoding of one of said encoded representations to another of said encoded representations can be performed without any substantial discontinuity; and
- a video encoding application operating on said host computer, wherein said video encoding application generates said output from said digital video input sequence.

16. The system of claim 15, wherein said video encoding application is configured to generate a set of data from said digital video input sequence, said video encoding application using said set of data to generate said plurality of encoded representations of said digital video input sequence.

17. The system of claim 15, further comprising a storage device used to store said encoded representations.

18. The system of claim 15, further comprising a server configured to transmit at least one of said encoded representations over a communications network for presentation, said server responsive to a transition signal to switch from transmitting one of said encoded representations to transmitting another of said encoded representations to a client without a substantial interruption in said presentation.

19. The system of claim 15, further comprising a decoder configured to decode a frame preceding a first synchronization frame in one of said encoded representations, then to decode a second synchronization frame in another of said encoded representations, said second synchronization frame having substantially the same temporal location as said first synchronization frame.

20. A data file containing a plurality of independent encoded representations of a video sequence comprising:
- a first of said encoded representations having a first set of synchronization frames; and
- a second of said encoded representations having a second set of designated synchronization frames, wherein each of said second set of synchronization frames is associated with one of the first set of synchronization frames, and wherein the associated synchronization frames have a substantially similar temporal location in the video sequence such that switching between a decoding of the first of said encoded representations and the second of said encoded representations can be performed without any substantial discontinuity.

21. The data file of claim 20, wherein said encoded representations comprise segments, and wherein segments of said first encoded representation are interleaved in said data file with segments of said second encoded representation.

22. The data file of claim 20, wherein each of said encoded representations is included contiguously within said data file.

23. The data file of claim 20, further comprising synchronization information, said synchronization information comprising locations of synchronization points within said data file.

24. A method of producing a plurality of encoded representations of an input media signal comprising:
- receiving the input media signal with an encoder; and
- generating the plurality of encoded representations of said input media signal with the encoder, wherein at least a same portion of the media signal is included in each of a first encoded representation and a second encoded representation, wherein the first and second encoded representations are encoded according to a different set of encoding parameters, and wherein the first and second encoded representations each include a respective identified synchronization frame that enables switching between the first and second encoded representations.

25. The method of claim 24, wherein each of said encoded representations is a complete and separate representation of said input media signal.

26. The method of claim 24, wherein any one encoded representation can be decoded without reference to another encoded representation.

27. The method of claim 24, wherein said set of data comprises intermediate encoding data.

28. The method of claim 24, wherein said input media signal is a video input sequence comprising frames of digitized video.

29. The method of claim 28, wherein said set of data comprises transform data.

30. The method of claim 28, wherein said set of data comprises discrete cosine transform data.

31. The method of claim 28, wherein said set of data comprises motion vector data.

32. The method of claim 28, wherein said set of data comprises color converted frame data.

33. The method of claim 28, wherein said set of data comprises resampled frame data.

34. A series of executable instructions embodied in a tangible computer-readable medium which, when executed by a processor, causes the processor to:
generate a plurality of encoded representations of said input media signal, wherein at least a same portion of the media signal is included in each of a first and second encoded representation, wherein the first and second encoded representations are encoded according to a different set of encoding parameters, and wherein the first and second encoded representations respectively include a designated synchronization frame that enables switching between the first and second encoded representations; and
store at least one of the plurality of said encoded representations in a tangible computer-readable medium.

35. A system for producing a plurality of encoded representations of a video input sequence comprising:
a video encoder configured to generate a set of intermediate encoding data from said video input sequence, said video encoder using said set of intermediate encoding data to generate said plurality of independent encoded representations of said video input sequence, wherein at least a portion of the video input sequence is included in one of the plurality of the encoded representations and said portion is included in another one of the plurality of the encoded representations, wherein each encoded representation is encoded according to a different set of encoding parameters, and wherein each encoded representation respectively includes a designated synchronization frame that enables switching between encoded representations without substantial discontinuity; and
an output module configured to output said encoded representations.

36. The method of claim 1, wherein said plurality of encoded representations are interleaved in an output file or output stream.

37. The method of claim 1, wherein the input media signal comprises a plurality of different media sources.

38. The method of claim 37, wherein the media sources comprise at least one from the group consisting of: audio segments, video frames, graphics, and still images.

39. The method of claim 1, wherein said input media signal comprises video and audio.

40. The method of claim 1, wherein each of said encoded representations is a representation of a portion of the input media signal.

41. The method of claim 1, wherein each of said encoded representations is a representation of the entire input media signal.

42. The method of claim 1, further comprising storing the plurality of encoded representations of the input media signal in a memory, wherein the memory comprises at least one from the group consisting of: a media server, download server, a video server, a hard disk drive, a CD rewriteable drive, and a read/write DVD drive.

43. The method of claim 1, further comprising storing the plurality of encoded representations of the input media signal in a memory for streaming at least one of the encoded representations to a decoder.

44. The series of claim 9, wherein each of said encoded representations can be decoded independently of any other encoded representation.

45. The system of claim 10, wherein each of said encoded representations can be decoded independently of any other encoded representation.

46. A method of encoding, the method comprising:
receiving a media signal;
generating with an encoder a first encoded representation of at least a selected part of the media signal using a first set of data and a first set of encoding parameters;
generating with the encoder a second encoded representation of the at least a selected part of the media signal using the first set of data and a second set of encoding parameters that is different than the first set of encoding parameters; identifying corresponding synchronization points in the first and second encoded representations; and storing at least one of said plurality of encoded representations in a tangible computer-readable medium.

47. The method of claim 46, wherein said plurality of encoded representations are interleaved in an output file or output stream.

48. The method of claim 47, wherein the input media signal comprises a plurality of different media sources.

49. The method of claim 48, wherein the media sources comprise at least one from the group consisting of: audio segments, video frames, graphics, and still images.

50. The method of claim 47, wherein said input media signal comprises video and audio.

51. The method of claim 47, wherein each of said encoded representations is a representation a portion of the input media signal.

52. The method of claim 47, wherein each of said encoded representations is a representation of the entire input media signal.

53. The method of claim 47, further comprising storing the plurality of encoded representations of the input media signal in a memory, wherein the memory comprises at least one from the group consisting of: a media server, download server, a video server, a hard disk drive, a CD rewriteable drive, and a read/write DVD drive.

54. The method of claim 47, further comprising storing the plurality of encoded representations of the input media signal in a memory for streaming at least one of the encoded representations to a decoder.

55. A method of producing a plurality of encoded representations of an input media signal, the method comprising:
providing the input media signal to an encoder;
encoding said input media signal with said encoder to generate the plurality of encoded representations of the input media signal, wherein at least a portion of the media signal is included in a first encoded representation of said plurality of encoded representations and the same portion is also included in a second encoded representation of said plurality of encoded representations, and said first encoded representation is encoded according to a different set of encoding parameters than is said second encoded representation; and designating a plurality of synchronization points within each of said encoded representations of the input media signal such that switching between a decoding of one of said encoded representations and another of said encoded representations can be performed without any substantial discontinuity;

wherein designating a plurality of synchronization points includes:

determining whether a frame in a master representation of the media presentation is intra-encoded, comparing a temporal period since the previous synchronization point to a maximum temporal period between adjacent synchronization points, and in response to the temporal period being equal to or greater than a predetermined percent of the maximum temporal period, and to the frame being intra-coded, designating the frame as a synchronization frame.

56. The method of claim 55 wherein the predetermined percent includes 90 percent.

57. The method of claim 1 wherein designating a plurality of synchronization points includes:

determining whether each frame of the plurality of encoded representations is intra-encoded, and in response to each frame being intra-coded, designating each frame as a synchronization frame.

58. The method of claim 46 wherein the first set of data includes one or more of color data, motion vector data, and discrete cosine coefficients.

* * * * *